US008786156B2

(12) United States Patent
Hino et al.

(10) Patent No.: US 8,786,156 B2
(45) Date of Patent: Jul. 22, 2014

(54) ROTATING ELECTRIC MACHINE FOR VEHICULAR USE

(75) Inventors: Noriaki Hino, Mito (JP); Yutaka Matsunobu, Mito (JP); Shinji Sugimoto, Hitachi (JP); Akinori Kamiya, Hitachi (JP); Yasuyuki Saito, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 241 days.

(21) Appl. No.: 13/389,774

(22) PCT Filed: Aug. 12, 2010

(86) PCT No.: PCT/JP2010/063699
§ 371 (c)(1),
(2), (4) Date: Mar. 29, 2012

(87) PCT Pub. No.: WO2011/019069
PCT Pub. Date: Feb. 17, 2011

(65) Prior Publication Data
US 2012/0175988 A1    Jul. 12, 2012

(30) Foreign Application Priority Data
Aug. 12, 2009    (JP) .................................. 2009-186969

(51) Int. Cl.
    *H02K 21/12* (2006.01)
(52) U.S. Cl.
    USPC .................................. 310/156.53; 310/156.47
(58) Field of Classification Search
    USPC ............. 310/156.53, 156.47, 156.38, 156.56, 310/156.25
    See application file for complete search history.

(56) References Cited

U.S. PATENT DOCUMENTS

| 6,815,858 B2 | 11/2004 | Matsunobu et al. |
| 7,755,243 B2* | 7/2010 | Mizutani et al. ....... 310/216.007 |
| 2004/0145263 A1* | 7/2004 | Kojima et al. ........... 310/156.23 |
| 2007/0138892 A1* | 6/2007 | Horst ....................... 310/156.53 |
| 2007/0159021 A1* | 7/2007 | Horst ....................... 310/156.53 |
| 2011/0309706 A1* | 12/2011 | Takahashi et al. ....... 310/156.53 |

FOREIGN PATENT DOCUMENTS

| JP | 1-122353 A | 5/1989 |
| JP | 3-222641 A | 10/1991 |
| JP | 9-308147 A | 11/1997 |
| JP | 2003-333778 A | 11/2003 |
| JP | 2006-60952 A | 3/2006 |
| JP | 2008-136352 A | 6/2008 |

OTHER PUBLICATIONS

International Search Report with English translation dated Nov. 2, 2010 (four (4) pages).

* cited by examiner

*Primary Examiner* — Nguyen N Hanh
(74) *Attorney, Agent, or Firm* — Crowell & Moring LLP

(57) ABSTRACT

A rotating electric machine for vehicular use includes: a stator that includes a stator core and a stator winding wound at the stator core; and a rotor that is rotatably disposed relative to the stator and includes a rotor core formed by laminating a plurality of electromagnetic steel sheets with a plurality of magnet insertion holes formed therein and includes a plurality of permanent magnets each held in each of the plurality of magnet insertion holes to form a magnetic pole. Each of the plurality of permanent magnets extends along a rotor axis and is formed in a shape assuming at least two different lengths along a circumference of the rotor.

17 Claims, 24 Drawing Sheets

ROTOR POSITION (IN ELECTRICAL ANGLE)

FIG.22
(a)
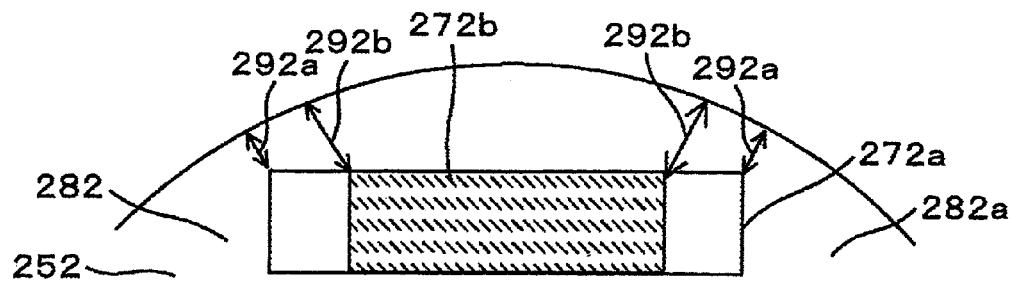
(b)
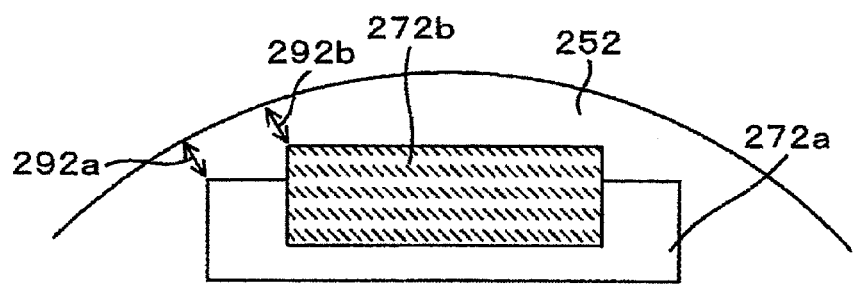
(c)
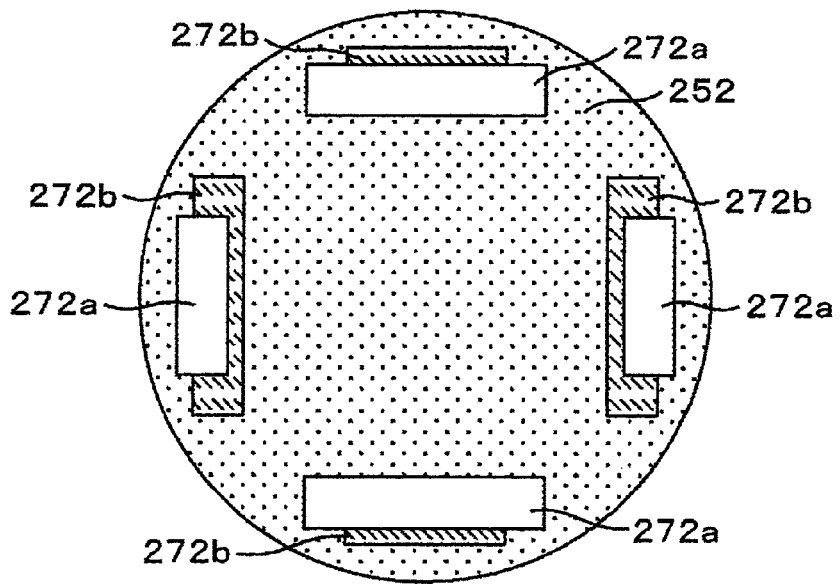

ROTATING ELECTRIC MACHINE FOR VEHICULAR USE

TECHNICAL FIELD

The present invention relates to a rotating electric machine for vehicular use.

BACKGROUND ART

Steady efforts have been focused on the development of hybrid vehicles that travel based upon the outputs from both an engine and a rotating electric machine and pure electric vehicles that travel exclusively based upon the output torque provided by a rotating electric machine. In this specification, the term "electric vehicle" is used to refer to both a hybrid vehicle and a pure electric vehicle. The rotating electric machine installed in an electric vehicle to enable traveling operation, which is required to provide a large output, includes permanent magnets constituted with sintered rare-earth magnets having strong magnetic energy. In the rotating electric machine installed in the electric vehicle to propel the electric vehicle, the permanent magnets are embedded within a rotor core.

Torque pulsations, induced by a cogging torque or the like, are bound to occur in a rotating electric machine. Such torque pulsations occurring in the rotating electric machine may cause noise or vibration. Torque pulsations occurring in an electric vehicle, in particular, may cause driver/passenger discomfort during vehicle takeoff. Accordingly, various attempts have been made in the related art to reduce torque pulsations in rotating electric machines by slightly changing each position of the permanent magnets at the rotor along the circumferential direction according to the axial direction. Such technologies are taught in patent literature 1 and patent literature 2.

In the rotating electric machine described in patent literature 1, the position of each permanent magnet embedded in the rotor core is slightly offset along the circumferential direction in correspondence to the position of the permanent magnet assumed along the rotational axis of the rotating electric machine. The publication discloses a technology for reducing torque pulsations by slightly offsetting the position of the permanent magnet along the circumferential direction in correspondence to its position assumed along the rotational axis as described above.

The rotating electric machine used in automotive applications typically adopts a structure that is bound to induce a significant reluctance torque in order to minimize the extent to which the torque output is reduced in a high-speed rotation range. In other words, its rotor adopts a structure that assures a lower magnetic resistance at auxiliary magnetic poles through which a q-axis magnetic flux passes, relative to the q-axis magnetic flux generated with an electric current flowing through the stator, in order to increase the reluctance torque. This rotor structure requires less magnet mass and makes it possible to keep down the internally induced voltage in the high-speed rotation range, since the increased reluctance torque reduces the ratio of the magnetic torque attributable to the permanent magnets, to the output torque of the rotating electric machine. It is desirable that reluctance torque pulsations, as well as the magnetic torque pulsations, be minimized in such a rotating electric machine in which the reluctance torque is actively utilized.

The rotating electric machine disclosed in patent literature 1 does not adopt a structure that actively utilizes reluctance. Accordingly, patent literature 1, which simply refers to torque pulsations of the magnetic torque, does not mention or imply in any way whatsoever torque pulsations attributable to the reluctance torque. In addition, the torque pulsations described in patent literature 1, which contains a significant axial component, manifesting along the axial direction in correspondence to the torque generated at the rotating electric machine, give rise to a problem in that a large thrusts force is bound to occur along the axial direction in correspondence to the torque generated at the rotating electric machine.

While reluctance is actively utilized in the structure adopted in the rotating electric machine disclosed in patent literature 2, the publication does not discuss torque pulsations attributable to the reluctance torque.

CITATION LIST

Patent Literature

Patent Literature 1: Japanese Laid Open Patent Publication No. 2006-060952
Patent Literature 2: Japanese Laid Open Patent Publication No. 2003-333778

SUMMARY OF INVENTION

Technical Problem

As described above, torque pulsation reduction in a rotating electric machine is a challenge that needs to be overcome. In particular, torque pulsation reduction is an even more critical goal in rotating electric machines used in automotive applications since torque pulsations in automotive rotating electric machines are likely to adversely affect the comfort of the ride.

Solution to Problem

According to the 1st aspect of the present invention, a rotating electric machine for vehicular use comprises: a stator that includes a stator core and a stator winding wound at the stator core; and a rotor that is rotatably disposed relative to the stator and includes a rotor core formed by laminating a plurality of electromagnetic steel sheets with a plurality of magnet insertion holes formed therein and includes a plurality of permanent magnets each held in each of the plurality of magnet insertion holes to form a magnetic pole. Each of the plurality of permanent magnets extends along a rotor axis and is formed in a shape assuming at least two different lengths along a circumference of the rotor.

According to the 2nd aspect of the present invention, in the rotating electric machine for vehicular use according to the 1st, it is preferred that the each of the plurality of permanent magnets is constituted with n (n is an integer equal to or greater than 2) types of magnet pieces set side-by-side along the rotor axis; and the n types of magnet pieces assume lengths along the circumference of the rotor that are different from one another by an extent equivalent to approximately $120°/n$ in electrical angle, and the n types of magnet pieces are disposed so that central lines running through centers of the magnet pieces, assumed along the circumference of the rotor, form a substantially single straight line running along the rotor axis. Therefore, at least pulsations attributable to a sixth-order torque in the magnetic torque can be reduced. By assuming a greater value for n, torque pulsations attributable to torque of another order, too, can be reduced.

According to the 3rd aspect of the present invention, in the rotating electric machine for vehicular use according to the 2nd aspect, it is preferred that the n types of magnet pieces constituting the each of the permanent magnets each assume a substantially quadrangular shape viewed from a stator side.

According to the 4th aspect of the present invention, in the rotating electric machine for vehicular use according to the 2nd or the 3rd aspect, it is preferred that the n types of magnet pieces constituting the each of the permanent magnets all assume a form achieving symmetry relative to the central lines running through the centers of the magnet pieces.

According to the 5th aspect of the present invention, in the rotating electric machine for vehicular use according to any one of the 2nd through 4th aspects, it is preferred that the magnet insertion holes are each constituted with m (m is an integer equal to or greater than 2) types of holes, assuming lengths at hole inner circumferential surfaces along the circumference of the rotor, which are different from one another, and set one after another along the rotor axis; and the lengths of the m types of holes at the hole inner circumferential surfaces along the circumference of the rotor are different from one another by an extent equivalent to approximately $120°/m$ in electrical angle. Therefore, at least pulsations attributable to a sixth-order torque in the reluctance torque can be reduced. By assuming a greater value for m, torque pulsations attributable to torque of another order, too, can be reduced.

According to the 6th aspect of the present invention, in the rotating electric machine for vehicular use according to any one of the 2nd through the 4th aspects, it is preferred that a length of the each of the plurality of permanent magnets along the circumference of the rotor is set within a range between a length equivalent to $(120/n-5)°$ in electrical angle and a length equivalent to $(120/n+5)°$ in electrical angle.

According to the 7th aspect of the present invention, in the rotating electric machine for vehicular use according to the 5th aspect, it is preferred that a length of each of the magnet insertion holes at a hole inner circumferential surface along the circumference of the rotor is set within a range between a length equivalent to $(120/m-5)°$ in electrical angle and a length equivalent to $(120/m+5)°$ in electrical angle.

According to the 8th aspect of the present invention, in the rotating electric machine for vehicular use according to the 1st aspect, it is preferred that the each of the plurality of permanent magnets is constituted with n (n is an integer equal to or greater than 1) types of magnet pieces set side-by-side along the rotor axis; and the n types of magnet pieces assume lengths along the circumference of the rotor that are different from one another by an extent equivalent to approximately $60°/n$ in electrical angle, and the n types of magnet pieces are disposed so that central lines running through centers of the magnet pieces, assumed along the circumference of the rotor, form a substantially single straight line running along the rotor axis. Therefore, at least pulsations attributable to a twelfth-order torque in the magnetic torque can be reduced. By assuming a greater value for n, torque pulsations attributable to torque of another order, too, can be reduced.

According to the 9th aspect of the present invention, in the rotating electric machine for vehicular use according to the 8th aspect, it is preferred that the n types of magnet pieces constituting the each of the permanent magnets each assume a substantially quadrangular shape viewed from a stator side.

According to the 10th aspect of the present invention, in the rotating electric machine for vehicular use according to the 8th or the 9th claim, it is preferred that the n types of magnet pieces constituting the each of the plurality of permanent magnets all assume a form achieving symmetry relative to the central lines running through the centers of the magnet pieces.

According to the 11th aspect of the present invention, in the rotating electric machine for vehicular use according to any one of the 8th through the 10th aspects, it is preferred that the magnet insertion holes are each constituted with m (m is an integer equal to or greater than 1) types of holes, assuming lengths at hole inner circumferential surfaces along the circumference of the rotor, which are different from one another, and set one after another along the rotor axis; and the lengths of the m types of holes at the hole inner circumferential surfaces along the circumference of the rotor are different from one another by an extent equivalent to approximately $60°/m$ in electrical angle. Therefore, at least pulsations attributable to a twelfth-order torque in the reluctance torque can be reduced. By assuming a greater value for m, torque pulsations attributable to torque of another order, too, can be reduced.

According to the 12th aspect of the present invention, in the rotating electric machine for vehicular use according to any one of the 8th through 10th aspects, it is preferred that a length of the each of the plurality of permanent magnets along the circumference of the rotor is set within a range between a length equivalent to $(60/n-5)°$ in electrical angle and a length equivalent to $(60/n+5)°$ in electrical angle.

According to the 13th aspect of the present invention, in the rotating electric machine for vehicular use according to the 11th aspect, it is preferred that a length of each of the magnet insertion holes at a hole inner circumferential surface along the circumference of the rotor is set within a range between a length equivalent to $(60/m-5)°$ in electrical angle and a length equivalent to $(60/m+5)°$ in electrical angle.

According to the 14th aspect of the present invention, in the rotating electric machine for vehicular use according to the 1st aspect, it is preferred that the each of the plurality of permanent magnets held in one of the magnet insertion holes assumes an isosceles trapezoid shape with an upper base thereof set on one side along the rotor axis and a lower base thereof set on another side along the rotor axis viewed from a stator side; and auxiliary magnetic poles are formed for reluctance torque generation among a plurality of magnetic poles formed with the plurality of permanent magnets.

According to the 15th aspect of the present invention, in the rotating electric machine for vehicular use according to the 14th aspect, it is preferred that a difference between lengths of the upper base and the lower base of the each of the plurality of permanent magnets, which assumes the isosceles trapezoidal shape, held in each magnet insertion hole is equivalent to 120° or 60° in electrical angle; and the auxiliary magnetic poles each extend along the rotor axis so as to incline along the circumference of the rotor and a pair of auxiliary magnetic poles among the auxiliary magnetic poles, disposed on two opposite sides of one of the plurality of magnetic poles formed with the plurality of permanent magnets, are set so that the pair of auxiliary magnetic poles incline along opposite directions. Therefore, the thrust components acting toward the axis are canceled out by each other and, in theory, a thrust force applied toward the axis is completely eliminated. As a result, torque pulsations can be greatly reduced even in the actual product.

According to the 16th aspect of the present invention, in the rotating electric machine for vehicular use according to the 15th aspect, it is preferred that the rotor core is constituted with a plurality of stages, which are separated from one another along the rotor axis; and the plurality of stages are offset relative to one another along the circumference of the rotor so as to form the auxiliary magnetic poles on an incline along the circumference of the rotor.

According to the 17th aspect of the present invention, in the rotating electric machine for vehicular use according to the 1st aspect, it is preferred that the plurality of permanent magnets are each constituted with a plurality of magnet pieces; the plurality of magnet pieces constituting each of the plurality of permanent magnets form an isosceles trapezoid shape with an upper base thereof set on one side along the rotor axis and a lower base thereof set on another side along the rotor axis viewed from a stator side, and the plurality of magnet pieces are disposed so that central lines running through centers of the plurality of magnet pieces assumed along the circumference of the rotor, form a substantially single straight line along the rotor axis; and auxiliary magnetic poles are formed for reluctance torque generation among the plurality of magnetic poles formed with the plurality of permanent magnets.

According to the 18th aspect of the present invention, in the rotating electric machine for vehicular use according to the 17th aspect, it is preferred that a difference between lengths of the upper base and the lower base of each of the plurality of magnet pieces is equivalent to 120° or 60° in electrical angle.

Advantageous Effect of Invention

According to the present invention, torque pulsations occurring in a rotating electric machine with permanent magnets built into the rotor core thereof can be reduced.

DESCRIPTION OF EMBODIMENTS

Figure 1:
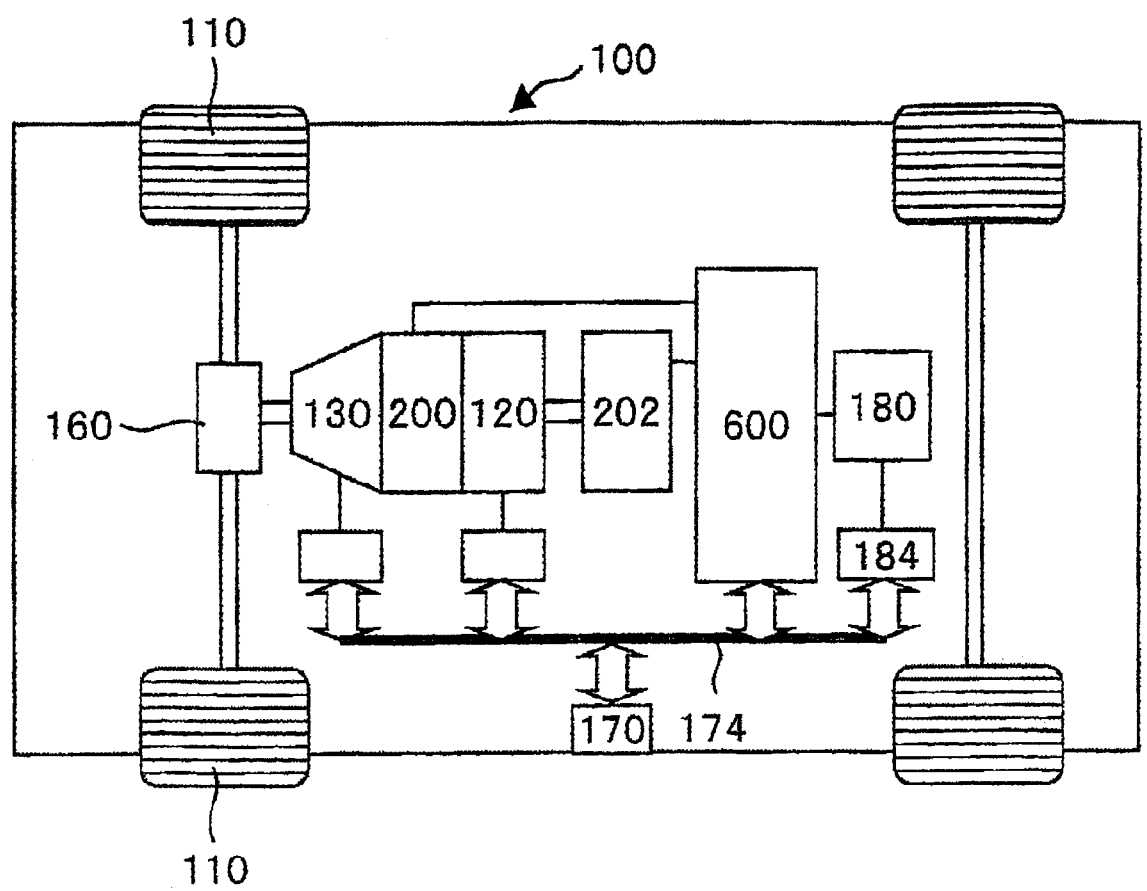
FIG. 1 A diagram showing the structure of a hybrid-type electric vehicle with a rotating electric machine achieved in an embodiment of the present invention installed therein FIG. 2 A circuit diagram pertaining to the power conversion device FIG. 3 A sectional view of the rotating electric machine achieved in the embodiment of the present invention FIG. 4 A external view of the stator in a perspective FIG. 5 A stator adopting a concentrated winding system in a partial enlargement FIG. 6 An illustration showing how a coil may be wound by adopting the concentrated winding system FIG. 7 Sectional views taken over planes intersecting the stator and the rotational axis of the rotor FIG. 8 An illustration showing the structures adopted for the stator and the rotor FIG. 9 An illustration of an undesirable skew formation FIG. 10 A characteristics diagram indicating torque pulsation reduction characteristics FIG. 11 An illustration of a block skew achieved in an embodiment of the present invention FIG. 12 An illustration of a block skew achieved in another embodiment of the present invention FIG. 13 Illustrations of block skews achieved in embodiments of the present invention FIG. 14 An illustration of an embodiment of the present invention achieved by adopting a three-block system FIG. 15 A characteristics diagram indicating the torque pulsation reduction characteristics achieved by adopting the structure shown in FIG. 14

Through the embodiments described below, various challenges that need to be addressed in products used in practical applications, as well as the technical problem discussed above, can be cleared. The following description of the embodiments given in reference to the drawings includes an explanation of how the various challenges to be addressed in products used in practical applications, as well as the technical problem discussed above, may be successfully met. It is to be noted that some typical challenges that must be addressed are described below.

(Improvement in Productivity)

(1) The embodiments to be described later include embodiments in which the permanent magnets used to form magnetic poles at the rotor are each constituted with n types of magnet pieces with each magnet piece formed in a substantially quadrangular shape. These embodiments, with the individual magnet pieces assuming a substantially quadrangular shape, assure superior productivity. In addition, by varying the length of the magnet pieces measured along the circumferential direction, the length of auxiliary magnetic poles formed between magnetic poles measured along the circumferential direction, too, can be varied. By achieving variance in the length of the auxiliary magnetic poles measured along the circumferential direction, torque pulsations attributable to the reluctance torque generated via the auxiliary magnetic poles, as well as torque pulsations attributable to the magnetic torque, can be reduced.

As explained above, the use of substantially quadrangular shape magnet pieces facilitates the formation of magnet insertion holes in each electromagnetic steel sheet used to constitute the rotor core, which, in turn, leads to improved productivity. In addition to the superior productivity, the use of magnet pieces assuming a substantially quadrangular shape as described above, further achieves an advantage in that torque pulsations attributable to both the magnetic torque and the reluctance torque are reduced. In a vehicle equipped with a drive rotating electric machine adopting this structure, noise is reduced and furthermore, good driver/passenger comfort is assured as the vehicle shifts from a stationary state into a traveling state or as the vehicle traveling at low speed shifts into an accelerating state.

(2) In conjunction with the magnet pieces constituting each permanent magnet, which are formed in a substantially quadrangular shape and ranging over n different lengths along the circumferential direction, the difference between the different lengths measured along the circumferential direction is set to a value equivalent to approximately $120/n°$ in electrical angle. Assuming that n is 2, at least torque pulsations attributable to a sixth-order torque can be reduced. In addition, when n is 3, at least torque pulsations attributable to the sixth-order torque and a twelfth-order torque can be reduced. Moreover, when the difference between the lengths measured along the circumferential direction is set to a value equivalent to approximately 60/n° in electrical angle, pulsations attributable to the twelfth-order torque can be reduced at n=2 and torque pulsations attributable to the twelfth-order torque and twenty fourth-order torque can be reduced at n=3.

(More Effective Torque Pulsation Reduction)

(1) The embodiments to be described later include those achieved in conjunction with permanent magnets formed in a substantially trapezoidal shape. By using substantially trapezoidal permanent magnets, torque pulsations attributable to torque of various orders can be reduced. In addition, in the embodiments described below, auxiliary magnetic poles disposed for the generation of reluctance torque are each constituted with a plurality of stages separated from one another along the rotational axis and reluctance torque pulsations are reduced by offsetting the positions of the individual stages relative to one another along the circumferential direction. This structure makes it possible to reduce the reluctance torque pulsations, in addition to reducing pulsations attributable to the magnetic torque, which is achieved by adopting an alternative shape for the magnet pieces constituting the permanent magnets, leading to a more effective overall reduction of torque pulsations.

(Improved Efficiency)

(1) The embodiments to be described later include those in which magnet pieces assuming a small length along the circumferential direction are disposed on two opposite sides along the axial direction of the rotor with a magnet piece assuming a large length along the circumferential direction positioned between them. Through such an embodiment, in which magnet pieces assuming a small length along the circumferential direction are disposed on the two opposite sides along the axis of the rotor, the extent of magnetic flux leakage from the permanent magnets can be reduced, which, in turn, leads to better efficiency.

(2) The embodiments to be described later include those in which a magnet piece assuming a small length along the circumferential direction is disposed further toward the outer circumference along the radial direction relative to the position of a magnet piece assuming a large length along the circumferential direction. In addition, in conjunction with permanent magnets assuming a trapezoidal shape, the part of each permanent magnet ranging over a small length along the circumferential direction is set further toward the outer circumference relative to the position taken by the part of the trapezoidal permanent magnet assuming a large length along the circumferential direction. By orienting the permanent magnet as described above, the extent of magnetic flux leakage occurring as a magnetic flux originating from the part of the permanent magnet located on the outer circumferential side, travels through the area between the permanent magnet and the outer circumference of the rotor to reach the central area of the permanent magnet via an auxiliary magnetic pole, can be reduced. Through such a reduction of magnetic flux leakage, the efficiency of the rotating electric machine itself can be improved.

(3) The embodiments to be described later include those in which the shape of magnet insertion holes formed to house trapezoidal permanent magnets is altered in steps. In such an embodiment, the magnet insertion holes are allowed to assume greater dimensions along the circumferential direction relative to the dimensions of the permanent magnets. The magnet insertion holes formed in such a shape make it possible to reduce the extent of magnetic flux leakage in addition to reducing reluctance pulsations. In other words, the presence of the gaps at the magnet insertion holes reduces the extent of magnetic flux leakage occurring as a magnetic flux originating from the portions of the permanent magnets located on the outer circumferential side travels through the area between the permanent magnets and the rotor outer circumference and reaches the central areas of the permanent magnets via the auxiliary magnetic poles. By reducing the magnetic flux leakage in this manner, the efficiency of the rotating electric machine itself can be improved.

(Reduction of Thrust Force Imparted Along the Rotational Axis)

(1) In the embodiments described below, permanent magnets are each disposed so that a central line (hereafter referred to as a magnet central line) running through the center of the permanent magnet taken along the circumferential direction is set along the central line of the corresponding magnetic pole running along the rotational axis. This positional arrangement makes it possible to reduce the thrust component manifesting along the rotational axis.

(2) In addition, in the embodiments described below, the output torque provided via the rotating electric machine contains a high ratio of reluctance torque at, for instance, 30%, 50% or more than 50%. By increasing the ratio of the reluctance torque to the output torque provided via the rotating electric machine, the usage of the permanent magnets can be kept down, which, in turn, makes it possible to reduce the internally induced voltage. Consequently, the extent to which the terminal voltage in the rotating electric machine rises in the high-speed rotational range can be reduced and ultimately, the level of current supply is not readily allowed to drop off. Thus, the extent to which the output torque becomes lowered in the high-speed rotational range is reduced. Furthermore, in such a magnet motor, which actively utilizes the reluctance torque, the auxiliary magnetic poles are allowed to assume a large length along the circumferential direction over the areas where the magnet pieces constituting the magnetic poles assume a smaller length along the circumferential direction. This means that the reluctance torque can be increased over the area where the magnetic torque is lowered. In other words, even under circumstances in which the thrust force entirely attributable to the magnetic torque occurs along the rotational axis, the overall torque includes the reluctance torque, which acts along a specific direction so as to cancel out the thrust force generated along the rotational axis due to the magnetic torque, thereby achieving an advantage in that the thrust force along the rotational axis can be reduced for the output torque as a whole.

(3) The embodiments to be described later include those in which the auxiliary magnetic poles are disposed with an offset along the circumferential direction relative to the rotational axis. In such an embodiment, the direction along which the auxiliary magnetic poles are offset relative to the rotational axis is alternately switched, and as a result, a relationship whereby the different thrust components manifesting along the rotational axis cancel each other out, is achieved with regard to the overall reluctance torque. Consequently, the overall thrust component manifesting along the rotational axis can be reduced. Furthermore, since the permanent magnets or the magnet pieces in the embodiments are each disposed so that the central line at the permanent magnet is aligned with the magnetic pole central line, the magnetic torque itself contains only a small thrust component manifesting along the rotational axis. This means that both the magnetic torque and the reluctance torque contain a very low ratio of the thrust component manifesting along the rotational axis.

Next, in reference to the drawings, the embodiments of the present invention will be described. The rotating electric machines to be described below each succeed in reducing the cogging torque and also in suppressing torque pulsations attributable to the stator current flowing as power is supplied. Furthermore, the rotating electric machines to be described below can each be provided as a compact unit at lower manufacturing cost. In other words, they can each be ideally utilized as a rotating electric machine for travelling installed in an electric vehicle to allow the electric vehicle to assure minimum vibration, less noise and reliable driver/passenger comfort.

While the rotating electric machines to be described above may each be adopted in a pure electric vehicle engaged in traveling operation exclusively via a rotating electric machine or in a hybrid type electric vehicle driven both by an engine and a rotating electric machine, the structure and the advantages of the rotating electric machine utilized in either type of electric vehicle will be substantially similar to those of the rotating electric machine utilized in the other type of electric vehicle. Accordingly, the following description is given by assuming that the present invention is adopted in a hybrid type electric vehicle.

FIG. 1 is a schematic illustration showing the structure of a hybrid type electric vehicle having installed therein the rotating electric machine achieved in an embodiment. An engine 120, a first rotating electric machine 200, a second rotating electric machine 202 and a battery 180 are mounted at a vehicle 100. The battery 180, constituted with lithium ion secondary batteries or the like, outputs high-voltage DC power in the 100 to 600 V range and provides DC power for conversion to AC power to be used to drive the rotating electric machine 200 and the rotating electric machine 202 when drive forces are needed to drive both the rotating electric machine 200 and the rotating electric machine 202. In a traveling state under regenerative control, however, the battery 180 receives DC power resulting from power conversion executed at a power conversion device 600 to convert AC power generated at the rotating electric machine 200 and the rotating electric machine 202, to DC power. The battery 180 and the rotating electric machines 200 and 202 exchange DC power via the power conversion device 600. In addition, although not shown, a battery that provides low voltage power (e.g., 14 V power) is installed in the vehicle so as to supply DC power to the various control circuits to be described below.

A rotational torque generated via the engine 120 and the rotating electric machines 200 and 202 is transmitted to the front wheels 110 via a transmission 130 and a differential gear unit 160. The battery 180 is controlled by a battery control device 184 and the battery control device 184, the power conversion device 600 and an integrated control device 170 are connected with one another via a communication line 174. The integrated control device 170 receives, via the communication line 174, information indicating the condition at the power conversion device 600 or the battery control device 184, or information indicating the condition at another control device as needed, from the power conversion device 600, the battery control device 184 or another control device. Based upon the information thus received, the integrated control device 170 generates through arithmetic operation a control command for the corresponding control device and the control command generated through the arithmetic operation is then transmitted to the particular control device via the communication line 174.

The battery control device 184 transmits information indicating the discharge condition at the battery 180 and the condition of the individual battery cells constituting the battery 180, including diagnostic results for each battery cell, to the integrated control device 170 via the communication line 174. Upon determining that the battery 180 needs to be charged or that regenerative braking control needs to be executed based upon the information provided from the battery control device 184 or based upon information pertaining to braking operation (not shown), the integrated control device 170 issues a power generation operation instruction to the power conversion device 600.

Based upon a torque command issued by the integrated control device 170, the power conversion device 600 controls the rotating electric machine 200 and the rotating electric machine 202 so as to generate a torque output or generate power as indicated in the command. The rotating electric machine 200 and the rotating electric machine 202 can be controlled so as to engage them both in operation as motors that output a rotational torque, or the rotating electric machine 200 and the rotating electric machine 202 can be controlled so as to engage them both in operation as electric power generators. Furthermore, either the rotating electric machine 200 or the rotating electric machine 202 may be engaged in operation as a motor and the other rotating electric machine may be engaged in operation as an electric power generator. Moreover, operation of either the rotating electric machine 200 or the rotating electric machine 202 or both the rotating electric machines 200 and 202 may be stopped.

Figure 2:
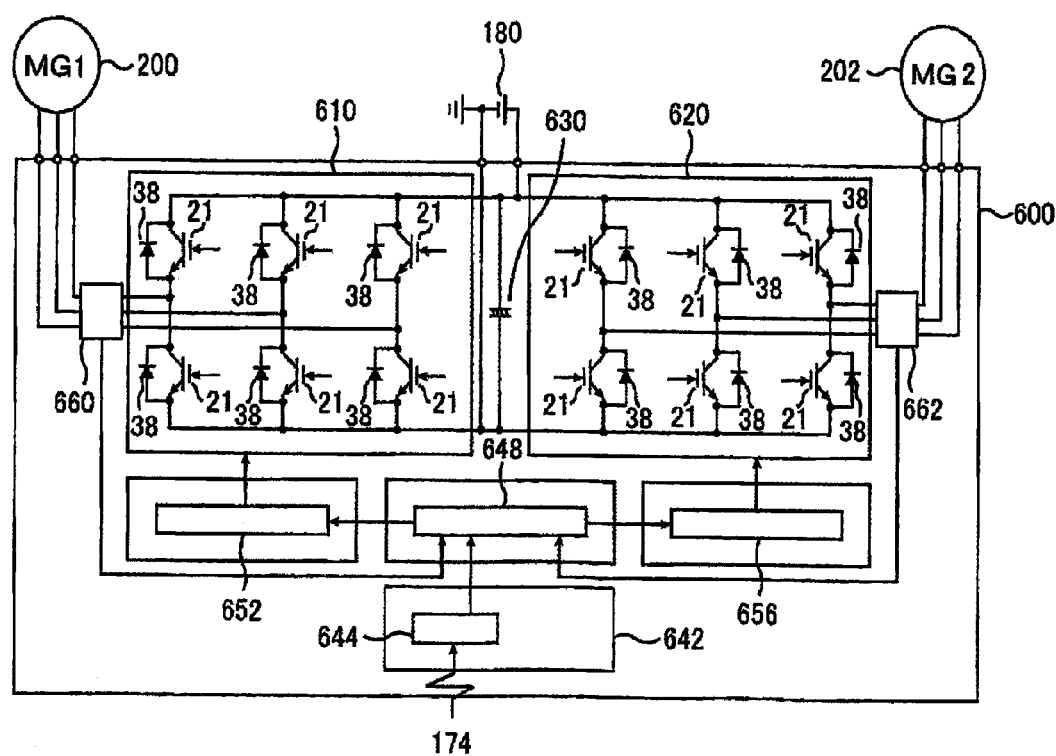

FIG. 2 is a circuit diagram pertaining to the power conversion device 600. The power conversion device 600 includes power modules 610 and 620 constituting inverter circuits respectively used to engage the rotating electric machine 200 and the rotating electric machine 202 in operation. The power modules 610 and 620 each include power semiconductors 21 that function as switching elements in order to enable power conversion from DC power to AC power or vice versa. As the power conversion device 600 controls switching operations of the power semiconductors 21 based upon a command issued by the integrated control device 170, the rotating electric machine 200 or the rotating electric machine 202 is engaged in operation as an electric motor or as a generator.

When engaging the rotating electric machine 200 and the rotating electric machine 202 in operation as electric motors, DC power originating from the high-voltage battery 180 is provided to the power module 610 and 620. The power conversion device 600 converts the supplied DC power to three-phase AC power achieving an optimal phase relation to the magnetic poles at the rotors of the rotating electric machines by controlling the switching operations of the power semiconductors and provides the three-phase AC power resulting from the conversion to the rotating electric machine 200 and the rotating electric machine 202. As a result, the rotating electric machine 200 and the rotating electric machine 202 each generate rotational torque.

When engaging the rotating electric machine 200 and the rotating electric machine 202 in operation as electric motors, on the other hand, the phases of the AC power generated via the power modules 610 and 620 are controlled so as to achieve an optimal phase relation to the positions of the magnetic poles at the rotors of the rotating electric machine 200 and the rotating electric machine 202 by controlling the switching timing for the inverter circuits. As a result, the rotating electric machine 200 and the rotating electric machine 202 are each rotationally driven based upon a rotational torque applied to the corresponding rotor from an outside source. The three-phase AC power induced at the stator windings of the rotating electric machine 200 and the rotating electric machine 202 is converted to DC power via the power modules 610 and 620 constituting the inverter circuits. The DC power is then provided to the high-voltage battery 180 from the power modules 610 and 620. The high-voltage battery 180 is charged with the DC power thus provided.

The power conversion device 600 includes a first inverter device that operates in conjunction with the rotating electric machine 200 and a second inverter device that operates in conjunction with the rotating electric machine 202. The first inverter device includes the power module 610, a first drive circuit 652 that controls the switching operations of the individual power semiconductors 21 in the power module 610, and a current sensor 660 that senses the electric current flowing at the rotating electric machine 200. The second inverter device includes the power module 620, a second drive circuit 656 that controls the switching operations of the individual power semiconductors 21 in the power module 620, and a current sensor 662 that senses the electric current flowing at the rotating electric machine 202. A control circuit 648, a capacitor module 630 and a transmission/reception circuit 644 mounted on a connector substrate 642 are shared by the first inverter device and the second inverter device.

Figure 3:
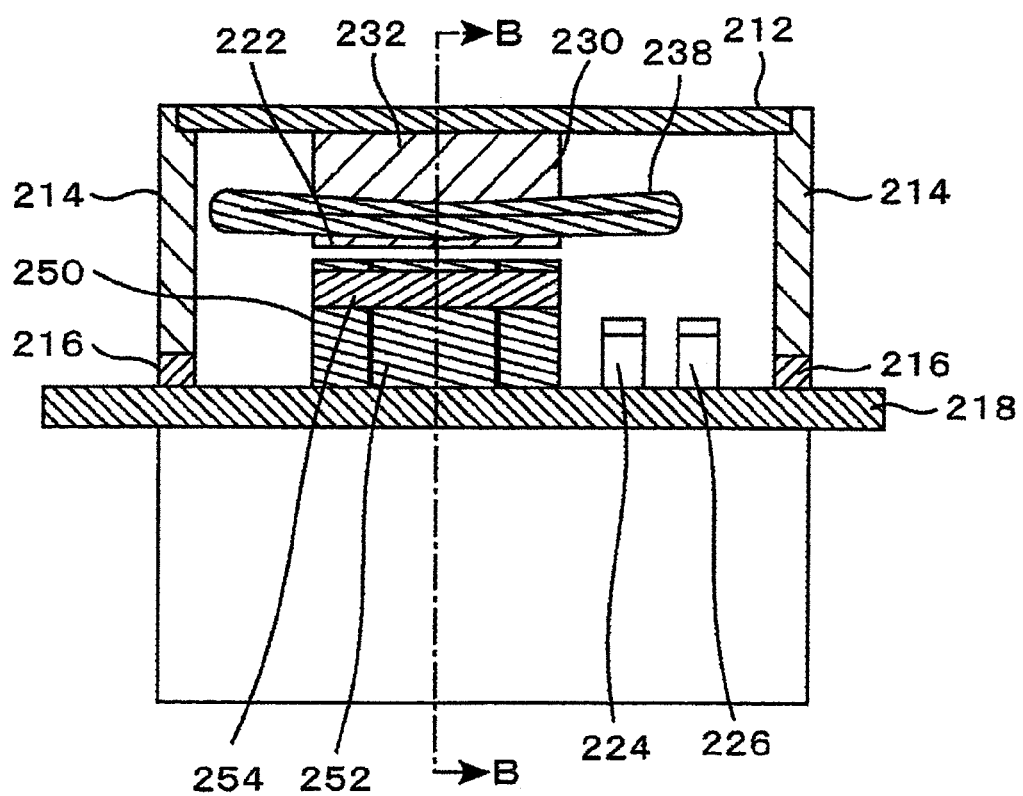

FIG. 3 shows the rotating electric machine 200 or the rotating electric machine 202 in FIG. 1 in a sectional view. Since the rotating electric machine 200 and the rotating electric machine 202 adopt structures that are substantially identical to each other, the structure of the rotating electric machine 200, chosen as a representative example, is described below. It is to be noted that while very significant advantages are achieved by adopting the structure described below in both the rotating electric machines 200 and 202, it is not strictly necessary that the structure be adopted in both rotating electric machines 200 and 202 and that advantages unique to the present invention will be achieved as long as the structure is adopted in at least either rotating electric machine.

Inside a housing 212, a stator 230, which includes a stator core 232 and a stator winding 238, is held. While the stator 230 may adopt either a concentrated winding system or a distributed winding system, a stator 230 with a winding achieved by adopting the distributed winding system will have characteristics whereby reluctance torque is generated more readily. Inside the stator core 232, a rotor 250 is rotatably held via a gap 222. The rotor 250 includes a rotor core 252 and permanent magnets 254. The rotor core 252 is fixed to a shaft 218. The housing 212 includes a pair of end brackets 214 at which bearings 216 are disposed. The shaft 218 is rotatably held by these bearings 216.

The rotor core 252 is constituted with numerous electromagnetic steel sheets laminated one on top of another along a direction in which the rotational axis extends. The electromagnetic steel sheets in the embodiment described below each include magnet insertion holes 272 (see FIG. 7), at which the permanent magnets 254 are inserted, formed therein. As will be explained later, instead of assuming a uniform length along the circumferential direction in which the rotor rotates, the magnet insertion holes 272 each take on n different lengths along the circumferential direction. The side elevation of the section of a magnet insertion hole 272 projected from the stator side, varies to take on an appearance of a plurality of rectangular insertion holes set one after another along the rotor axis, as in the embodiments described in reference to FIG. 11 and subsequent figures.

As shown in FIG. 3, a rotor position sensor 224 that detects the positions of the magnetic poles at the rotor 250 and a rotating speed sensor 226 that detects the rotating speed at which the rotor 250 rotates are disposed at the shaft 218. The outputs from these sensors 224 and 226 are taken into the control circuit 248 shown in FIG. 2. The control circuit 248 outputs a control signal generated based upon the outputs thus taken in to the drive circuit 652. The drive circuit 652, in turn, outputs a drive signal generated based upon the control signal to the power module 610. Based upon the drive signal, the power module 610 engages in switching operation so as to convert the DC power provided from the battery 180 to three-phase AC power. The three-phase AC power resulting from the conversion is supplied to the stator winding 238 shown in FIG. 3 and, as a result, a rotating magnetic field is generated at the stator 230. The frequency of the three-phase AC current is controlled based upon the detection value provided from the rotating speed sensor 226, whereas the phases of the three-phase AC current relative to the rotor 250 are controlled based upon the detection value provided by the rotor position sensor 224.

The stator winding 238 at the stator 230 shown in FIG. 3 may adopt either the distributed winding system or the concentrated winding system. FIG. 4 provides an external view of the stator 230 adopting the distributed winding system. In the distributed winding system, phase windings are wound around the stator core 232 so as to house a given phase winding in two slots 24 set apart from each other across a plurality of slots 24. The stator winding 238 shown in FIG. 4 can be constituted with coils 233 wound by adopting the distributed winding system. The magnetic field formed via the stator winding 238 adopting the distributed winding system assumes magnetic flux distribution characteristics more closely resembling the sine waves compared to the magnetic flux distribution characteristics of the magnetic field formed with a stator winding adopting the concentrated winding system described later. This means that a reluctance torque can be generated readily in a rotating electric machine equipped with a stator 230 adopting the distributed winding system and that the voltage induced in a high-speed rotational range can be more effectively suppressed in such a rotating electric machine. The rotating electric machine thus assures characteristics required of a drive rotating electric machine in an electric vehicle in which it is desirable to generate a drive torque even in the high-speed rotation range.

Figure 5:
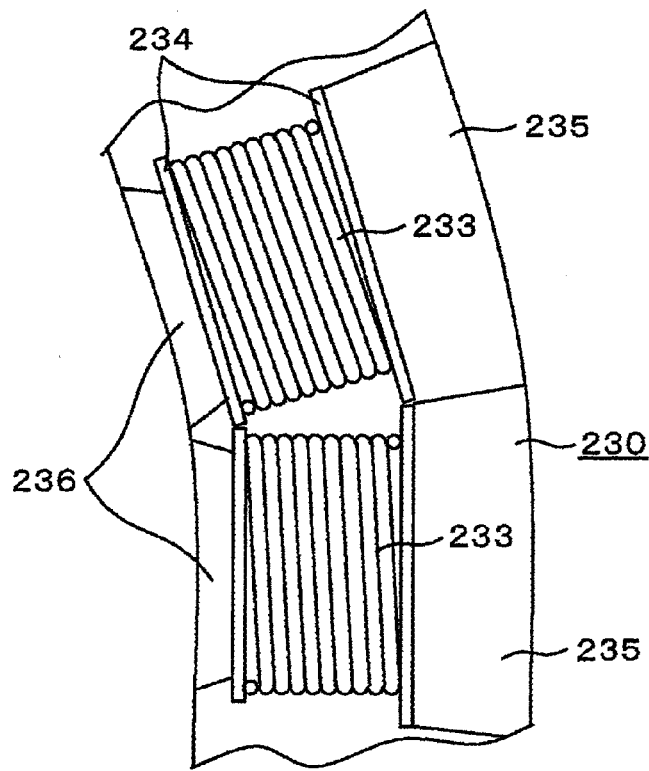
Figure 6:
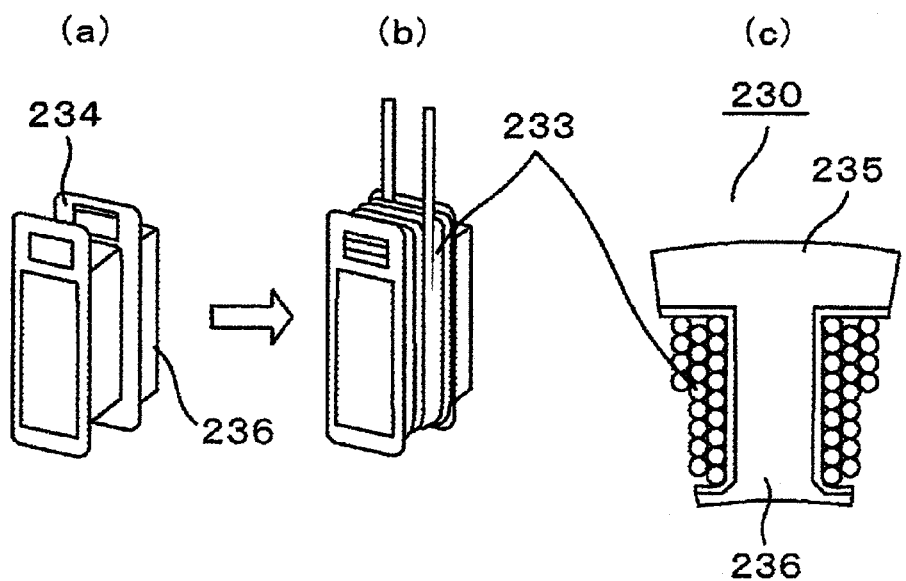

In reference to FIG. 5, a stator winding adopting the concentrated winding system is described. FIG. 5 and FIGS. 6(a), 6(b) and 6(c) present an example of a stator winding adopting the concentrated winding system. In the concentrated winding system, coils 233 are wound at each of teeth 236 formed at the stator 230. In order to facilitate the winding process, the stator core 232 is divided into T-shaped blocks each made up with a tooth 236 and a core back portion 235, a bobbin 234 is fitted at each tooth 236, as shown in FIG. 6(a), and the coils 233 is formed by winding a coated conductor around the bobbin, as shown in FIGS. 6(b) and 6(c). The presence of the bobbin 234, constituted with resin, assures insulation between the coils 233 and the tooth 236 formed by laminating the electromagnetic steel sheets one on top of another. Then, by assembling the individual blocks together, as shown in FIG. 5, the stator 230 is configured as an integrated unit.

Figure 7:
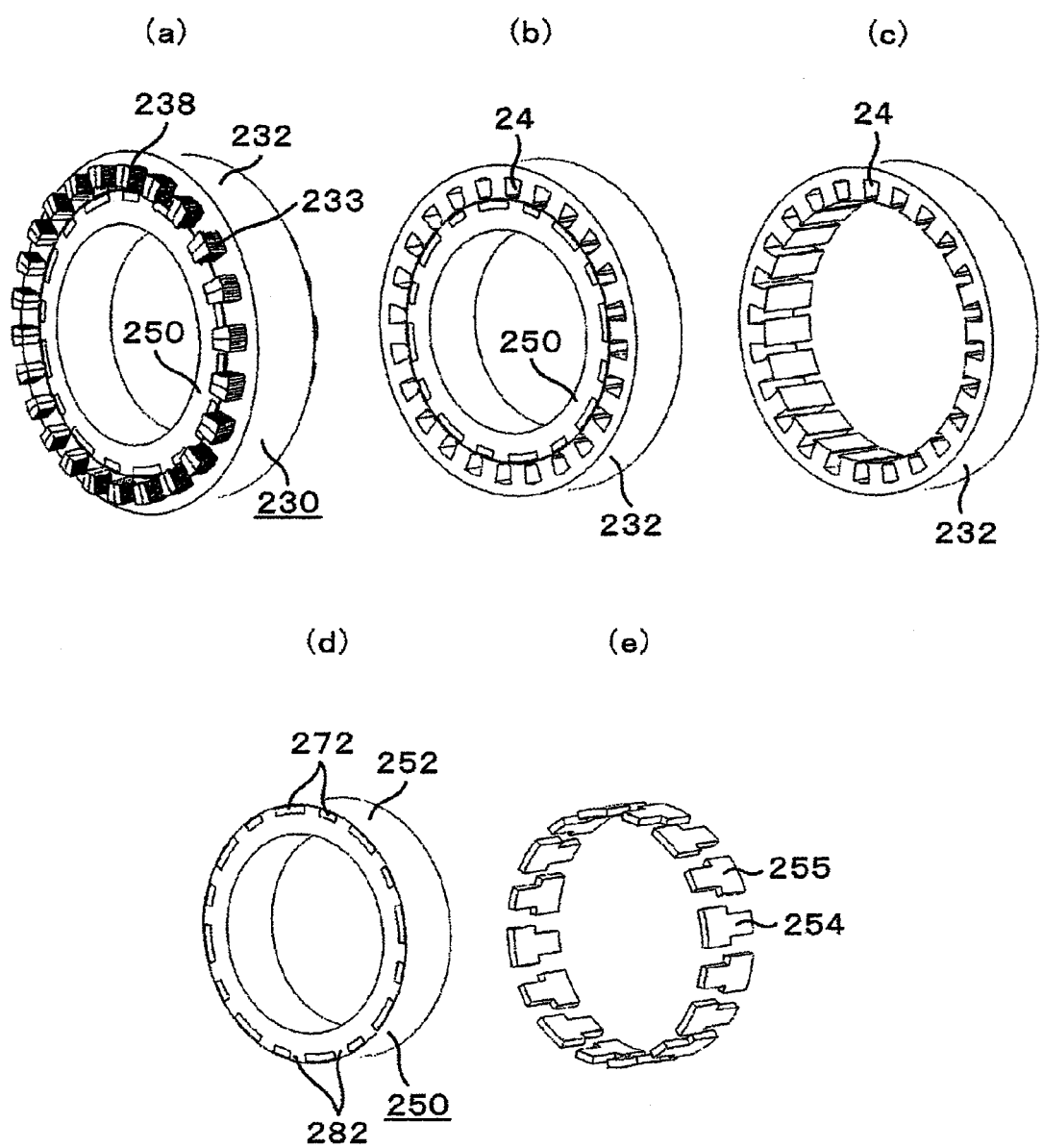

FIG. 7 presents perspective views of the stator 230 and the rotor 250 constituting part of the rotating electric machine 200. FIG. 7(a) shows the rotor 250 disposed on the inner side of the stator 230, whereas the illustration in FIG. 7(b) does not include the stator winding 238 and the coils 233, so as to show the shape of the stator core 232 with better clarity. In addition, FIG. 7(c), which does not include an illustration of the rotor 250, shows the stator core 232 formed by laminating electromagnetic steel sheets one on top of another. The stator core 232 includes slots 24 formed along the entire circumference thereof, at which the stator winding 238 is inserted. FIG. 7(*d*) shows the rotor core formed by laminating electromagnetic steel sheets one on top of another along the rotational axis. Each electromagnetic steel sheet used to constitute the rotor core has magnet insertion holes 272 formed along the entire circumference thereof. Reference numeral 272 is appended only to some of the magnet insertion holes so as not to crowd the illustration. An auxiliary magnetic pole, through which the magnetic flux generated along a q-axis passes is formed in the area of the rotor core located between successive magnet insertion holes 272, and a reluctance torque is generated due to the difference between the magnetic resistance at the magnetic circuit traveling through the auxiliary magnetic pole and the magnetic resistance at a d-axis magnetic circuit. In the embodiment, the magnetic poles at the rotor are each formed with a permanent magnet constituted with magnet pieces disposed in a single column, and an auxiliary magnetic pole is formed between successive magnet insertion holes. In a rotor with magnetic poles thereof each formed with magnet pieces disposed over two columns, however, an auxiliary magnetic pole is formed between the magnet pieces disposed in two columns and the magnet pieces disposed in the next two columns. FIG. 7(*e*) shows permanent magnets 254 and 255 inserted in the magnet insertion holes. While the permanent magnets 254 and 255 are each made up with several magnet pieces, as will be explained later, FIG. 7(*e*) does not show the individual magnet pieces.

The stator 230 in FIG. 7 includes the stator core 232 and the stator winding 238, which is constituted with the coils 233 inserted at the slots 24 in the stator core 232. The rotor 250 is formed by stacking electromagnetic silicon steel sheets with magnet insertion holes at which magnets are to be inserted, formed therein, and the permanent magnets 254 and the permanent magnets 255 are embedded in the magnet insertion holes. The magnetomotive force imparted from a permanent magnet 254 or a permanent magnet 255 inserted at a magnet insertion hole in the embodiment changes along the rotational axis of the rotating electric machine. In other words, the width of the magnet assumed along the circumferential direction does not remain uniform along the rotational axis of the rotating electric machine, i.e., the circumferential width of the magnet changes. The use of permanent magnets adopting such a shape reduces the extent of torque ripple.

Figure 8:
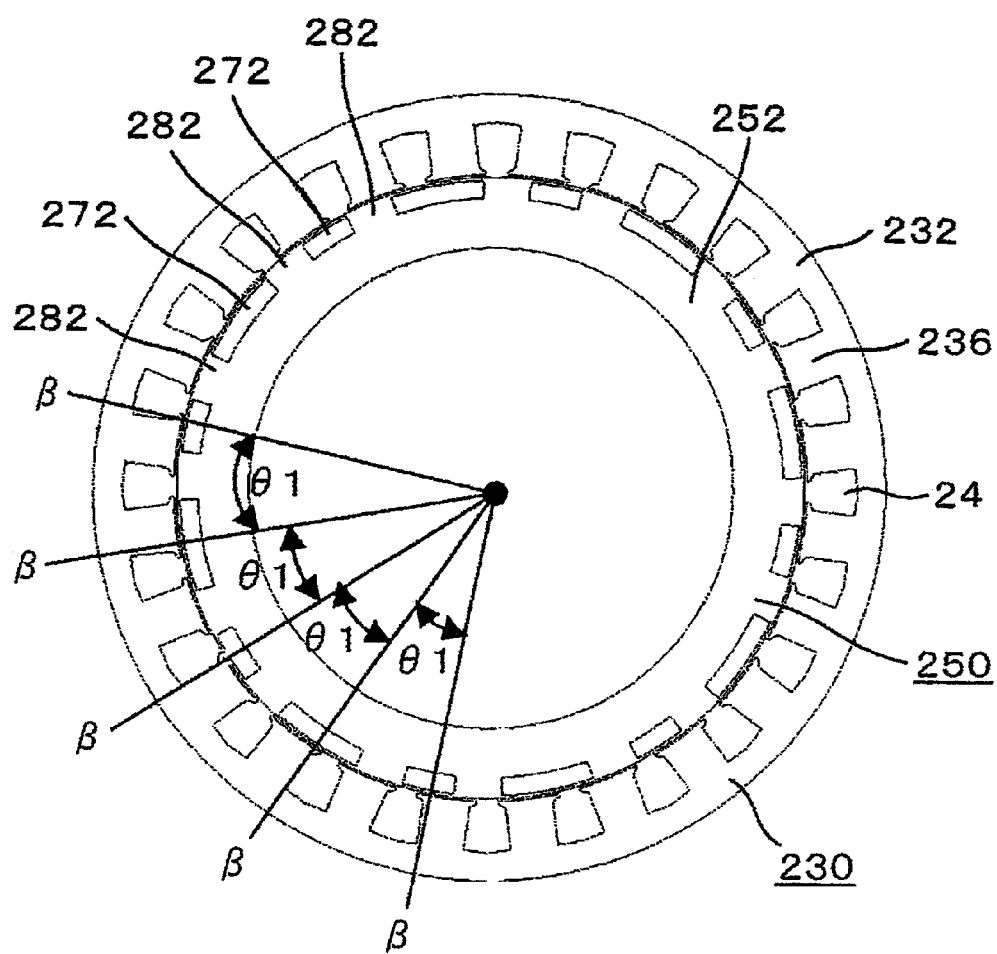

FIG. 8 shows the stator 230 and the rotor 250 in a sectional view taken along B-B in FIG. 3. It is to be noted that FIG. 8 does not include illustrations of the housing 212, the shaft 218 and the stator winding 238. On the inner side of the stator core 232, numerous slots 24 and teeth 236 are formed at equal intervals over the entire circumference. In order to avoid crowding, reference numerals 24 and 236 are appended only to some of the slots and teeth. A slot insulator (not shown) is disposed inside the slots 24, and a plurality of phase windings corresponding to u through w phases, to constitute the stator winding 238, are inserted in the slots 24. As explained earlier, the stator winding 238 in the embodiment may be formed by adopting the distributed winding system or the concentrated winding system.

At the rotor 250, the magnet insertion holes 272 are formed to hold permanent magnets therein, and magnetic poles are formed with the permanent magnets. A line β indicates the center of a magnetic pole at the rotor 250. The interval between the central line β running through the center of a given magnetic pole and the central line β running through the center of the next magnetic pole remains uniform, and the intervals between the central lines β in the figure are equivalent to a mechanical angle θ1. In this embodiment, each magnetic pole is formed with a permanent magnet made up with magnet pieces disposed in a single column. However, magnetic poles may each be formed with a plurality of permanent magnets disposed side-by-side along the circumferential direction, with the plurality of permanent magnets constituted with magnet pieces disposed over a plurality of columns set side-by-side along the circumferential direction, as explained earlier. In such a case, the magnetic flux density per pole can be raised since each magnetic pole is formed with a plurality of permanent magnets, and thus, the output of the rotating electric machine increases. Auxiliary magnetic poles 282, through which the q-axis magnetic flux is to pass, are each formed between a given magnetic pole at the rotor and the next magnetic pole. In this embodiment, a magnetic circuit with a large sectional area is formed so as to reduce the magnetic resistance at each auxiliary magnetic pole and thus, a significant reluctance torque is generated. As a result, the ratio of the reluctance torque to the overall torque generated in the rotating electric machine is raised, which, in turn, makes it possible to keep the internally induced voltage to a relatively low level in the high speed rotation range. Consequently, an advantage is achieved in that the current supplied during high-speed rotation is raised for the source voltage so as to increase the output torque in a high-speed traveling state.

In addition, it may become necessary to transmit torque to the wheels by increasing the rotating speed of the rotating electric machine via the mechanical transmission system in a high-speed traveling state. Through the embodiment, the output torque during high-speed rotation operation can be increased. Furthermore, torque pulsations can be reduced by adopting the embodiment. The torque pulsations in the rotating electric machine tend to adversely affect the mechanical transmission system via which the rotating speed is raised as the torque pulsations propagated to a gear constituting part of the mechanical transmission system readily cause noise at the gear as well as wear of the gear. By adopting the structure described below for the permanent magnets or forming the magnet insertion holes 272 at the rotor core 252 in a specific shape, as described below, or by adopting these features in combination, the adverse effect on the mechanical transmission system that tends to occur when the rotating speed is raised can be reduced.

The rotor core 252 of the rotor 250 shown in FIG. 8 includes the magnet insertion holes 272 formed therein based upon the shapes of the magnet pieces constituting the permanent magnets as described below and the permanent magnets embedded in the magnet insertion holes 272 are fixed with an adhesive or the like. The permanent magnets function as magnetic field poles (simply referred to as magnetic poles in the description of the embodiment) of the rotor 250.

The permanent magnets are magnetized along the radial direction, with the orientation of the magnetization alternated from one magnetic field pole to the next magnetic field pole. In other words, assuming that a side surface of the permanent magnet forming a given magnetic pole, located toward the stator, is magnetized to have N polarity and that its surface facing toward the central axis is magnetized to have S polarity, the side surface of the permanent magnet forming an adjacent magnetic pole, located toward the stator, is polarized to have S polarity and its surface facing toward the central axis is magnetized to have N polarity. The permanent magnets are disposed so as to form magnetic poles with alternate polarities over the entire circumference. In the embodiment, sixteen permanent magnets are disposed with equal intervals, and thus, sixteen magnetic poles are formed at the rotor 250. As described above, an auxiliary magnetic pole is formed between successive magnetic poles, the q-axis magnetic circuit is formed via the auxiliary magnetic pole and the magnetic resistance at the auxiliary magnetic pole is kept down, making it possible to generate a large reluctance torque. As a result, the utilization ratio of the reluctance torque in the output torque represented by the sum of the magnetic torque attributable to the permanent magnets and the reluctance torque can be raised in the embodiment. Through the use of the reluctance torque, the induced voltage can be kept to a low level, resulting in an advantage in that the extent to which the torque generated in a high-speed rotation state is reduced can be reduced.

Figure 9:
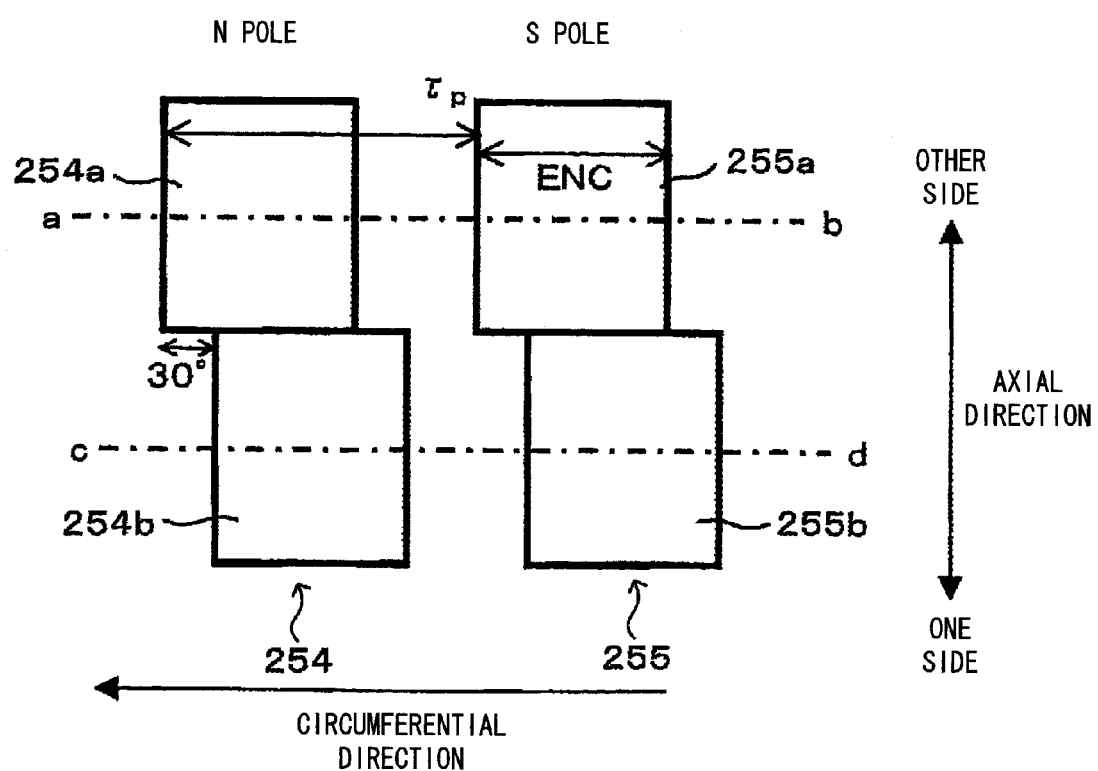

The process of magnetizing the permanent magnets is referred to as "polarization". In FIG. 9 and subsequent figures, a permanent magnet is indicated by reference numeral 254 or reference numeral 255. FIG. 8 shows the magnet insertion holes 272 at which the permanent magnets are inserted and held, although FIG. 8 does not include an illustration of the permanent magnets that are present within the magnet insertion holes 272. While the permanent magnets 254 and 255 are magnetized in opposite directions and the permanent magnets 255 assume a shape achieved by rotating a permanent magnet 254 by 180° along the rotational axis, the permanent magnets 254 and 255 are otherwise substantially similar in form and characteristics, and accordingly, the following description is given in reference to the permanent magnets 254. The permanent magnets 254 may be magnetized through the polarization in advance and then embedded at the rotor core 252, or they may be inserted at the rotor core 252 in an un-polarized state and then polarized by applying an intense magnetic field thereto. Once magnetized, the permanent magnets 254 exert a strong magnetic force. This means that if the permanent magnets 254 are polarized before they are fitted at the rotor 250, the strong attracting force occurring between the permanent magnets 254 and the rotor core 252 is likely to present a hindrance during the permanent magnet installation process. Furthermore, the strong attracting force may cause foreign matter such as iron dust to settle on the permanent magnets 254. For this reason, better rotating electric machine productivity is assured by magnetizing the permanent magnets 254 and 255 after they are inserted in the magnet insertion holes 272 at the rotor core 252.

The permanent magnets 254 and 255 may be neodymium-based sintered magnets, the primary constituents of which are neodymium, iron and boron, samarium-based sintered magnets, the primary constituents of which are samarium and cobalt, ferrite magnets or neodymium-based bonded magnets. The residual magnetic flux density of the permanent magnets 254 and 255 is approximately 0.4 to 1.3 T.

Next, the structure adopted for the permanent magnets 254 and 255 held in the magnet insertion holes 272 at the rotor 250 is described. In order to better demonstrate the features characterizing the embodiment, an example of an undesirable permanent magnet positional arrangement is first described in reference to FIG. 9. The figure shows the positional arrangement with which permanent magnets are disposed, viewed from the stator side. While the permanent magnets are actually held inside the magnet insertion holes at the rotor core, the figure does not include an illustration of the rotor core so as to show the permanent magnet positional arrangement with better clarity.

The permanent magnets 254 and 255 are disposed over the entire circumference of the rotor so that a permanent magnet 254 having N polarity at the surface thereof facing toward the stator and a permanent magnet 255 having S polarity at its surface facing toward the stator are set in an alternate pattern with a pole pitch τp along the circumferential direction. 360° representing a full cycle in electrical angle is equivalent to twice the pole pitch τp. The length ENC over which the magnets each extend along the circumference of the rotor is expressed in electrical angle. The permanent magnets 254 having N polarity are each split along the axial direction in which the rotational axis of the rotating electric machine extends (i.e., along the rotor axis) into a magnet piece 254a and a magnet piece 254b formed in identical shapes. The magnet piece 254a and the magnet piece 254b are offset relative to each other by 30° in electrical angle along the circumferential direction. In addition, the permanent magnets 255 having S polarity are also each split along the axial direction into a magnet piece 255a and a magnet piece 255b formed in identical shapes and offset relative to each other by 30° in electrical angle as are the magnet pieces constituting the permanent magnets having N polarity.

In the undesirable positional arrangement shown in FIG. 9, the magnet piece 255a and the magnet piece 255b disposed side-by-side along the rotor axis, are offset so as to form steps along the circumference of the rotor in a direction matching the direction in which the magnet piece 254a and the magnet piece 254b disposed side-by-side along the rotor axis are offset relative to each other so as to form steps. By disposing the magnet pieces with an offset of 30° in electrical angle, torque pulsations attributable to the shapes of the magnets can be reduced even when an undesirable positional arrangement such as that shown in FIG. 9 is adopted. Torque pulsations occurring in a motor with permanent magnets include a cogging torque generated in a no-load state. The term "cogging torque" refers to torque pulsations that occur due to the variance in the magnetic resistance between the rotor magnets and iron constituting the stator core, which changes from one position to another at the rotor. The cycle of the cogging torque occurring in a three-phase motor is 60° in electrical angle.

Figure 10:
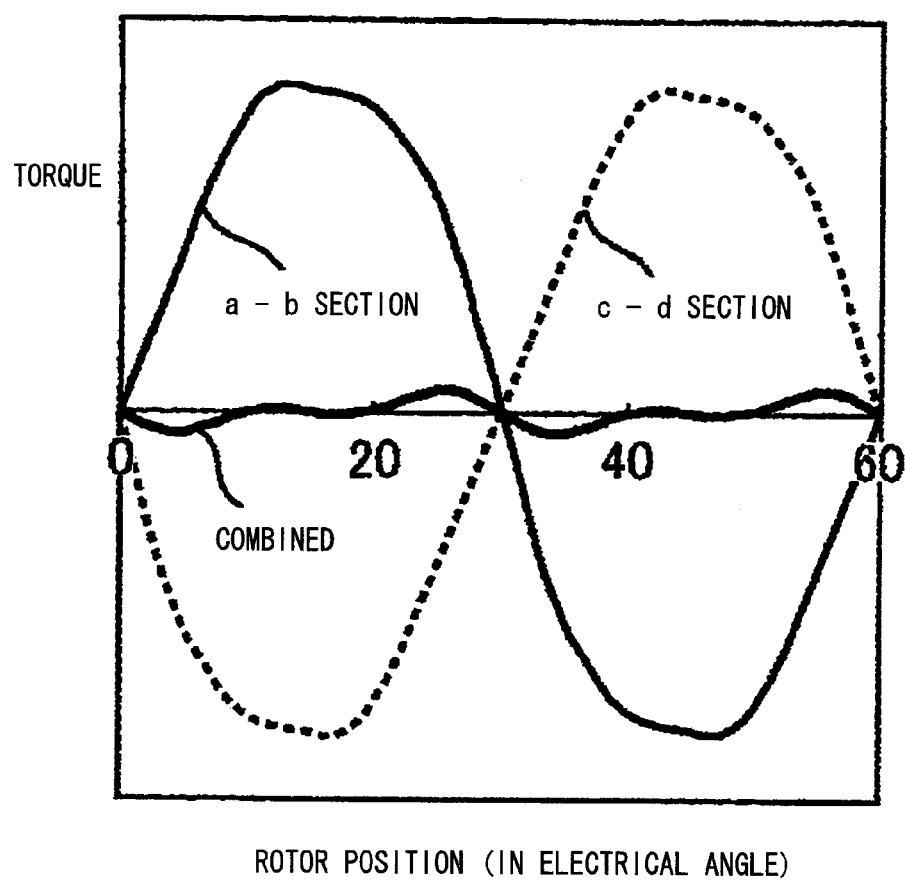

FIG. 10 shows waveforms of torque pulsations. The waveforms of cogging torque pulsations are determined in correspondence to a specific magnet piece position taken along the circumferential direction. In other words, if the magnet piece position is shifted along the circumferential direction, the torque pulsation peak and the torque pulsation trough also shift. If the magnet pieces are offset relative to each other by 30° along the circumferential direction as has been described in reference to FIG. 9, the cogging torque peak and the cogging torque trough also become offset by 30°, and the combined cogging torque pulsations cancel each other out, resulting in reduced overall torque pulsation, as shown in the figure.

While pulsations are reduced overall by offsetting identical magnet pieces by 30° as described above, a higher harmonic of higher order remains, as shown in FIG. 10. As explained earlier, the cycle of the fundamental wave of the cogging torque pulsations is equal to 60° in electrical angle, which is equivalent to a sixth-order cycle relative to the fundamental frequency of the power source. By redefining the waveforms with the cycle thereof equivalent to 60° in electrical angle as a first-order cogging torque and offsetting the magnet pieces by 30°, torque pulsations of odd numbered orders can be eliminated but torque pulsations of even-numbered orders, i.e., of 2 nth orders (n is an integer), cannot be eliminated.

FIG. 11(b) shows magnet pieces adopting desirable shapes and disposed in a desirable positional arrangement, whereas FIG. 11(a) shows magnet pieces with undesirable shapes and disposed in an undesirable positional arrangement for purposes of comparison. In order to simplify the description, the positional arrangement adopted in conjunction with the magnet pieces assuming the shapes shown in FIG. 11(b) will be referred to as a "block skew" formation, whereas the positional arrangement of the magnet pieces assuming the undesirable shapes shown in FIG. 11(a) will be referred to as a stepped skew formation. In the block skew formation shown in FIG. 11(b), two types of magnet pieces 254a and 254b or two types of magnet pieces 255a and 255b are disposed next to each other along the rotor axis running along the rotational axis. By disposing the two different types of magnet pieces ranging over different lengths along the circumferential direction next to each other along the rotor axis, the permanent magnet 254 or 255 is formed. The difference between the lengths of the magnet pieces constituting the permanent magnet, measured along the circumference of the rotor, is equal to approximately π/3 radian in electrical angle, i.e., equivalent to approximately 60°. While it is desirable that the difference between the lengths of the individual magnet pieces, measured along the circumference of the rotor, be an exact equivalent of 60° in electrical angle, a satisfactory advantage will be achieved even when there is a slight manufacturing error. The manufacturing error should not deviate beyond a tolerance range of +5° to −5° in electrical angle, and it is more desirable to ensure that the manufacturing error stay within a range of +3° to −3° in electrical angle. A line A in the undesirable stepped skew formation shown in FIG. 11(a) is substantially in alignment with a line F in the block skew formation. In addition, a line B in the stepped skew formation is substantially in alignment with a line E in the block skew formation. Likewise, lines C and D in the stepped skew formation are respectively in substantial alignment with lines G and H in the block skew formation. It is to be noted that a line a indicates the central position assumed at each magnet piece along the circumference of the rotor and that the central lines passing through the centers of the magnet pieces 254a and 254b constituting the permanent magnet 254 are substantially in alignment with each other. It is also to be noted that since a field pole is formed in the embodiment with a permanent magnet made up with magnet pieces disposed in a single column, the center of the magnetic pole and the central lines passing through the centers of the magnet pieces are substantially in alignment. In the desirable positional arrangement assumed for the magnet pieces, the center of the magnetic pole and the central lines a passing through the centers of the magnet pieces are substantially in alignment with each other, and each magnet piece takes on a symmetrical shape achieving symmetry along the circumferential direction relative to the central line passing through the center of the magnetic pole. In the embodiment, assuming that n types of magnet pieces make up a permanent magnet, the difference between the lengths of the magnet pieces measured along the circumference of the rotor, is set to a value equivalent to approximately 120°/n in electrical angle. In the example presented in FIG. 11(b), n is 2, and accordingly, the difference between the length of the magnet piece 254a and the length of the magnet piece 254b measured along the circumferential direction is equivalent to approximately 60° in electrical angle.

The shapes of the magnet pieces 254a and 254b and the positional relationship between the magnet pieces 254a and 254b are the same as those of the magnet pieces 255a and 255b, but the magnet pieces 254a and 254b are magnetized along a direction opposite from the direction in which the magnet pieces 255a and 255b are magnetized. On one side along the axial direction, the magnet piece 254b and the magnet piece 255b ranging over a greater length along the circumferential direction are disposed. The magnet quantity of the magnet pieces 254b and 255b is greater than that of the magnet pieces 254a and 255a and thus, the magnetic torque generated on the one side is greater than that generated on the other side. FIG. 11(b) shows an auxiliary magnetic pole 282 formed between the magnet pieces 254a and 255a and an auxiliary magnetic pole 282 formed between the magnet pieces 254b and 255b. The part of the auxiliary magnetic pole 282 formed between the magnet pieces 254a and 255a, located on the other side along the axial direction, ranges over a greater length along the circumferential direction compared to the part of the auxiliary magnetic pole 282 formed between the magnet pieces 254b and 255a, located on the one side along the axial direction. This means that a greater reluctance torque is generated with the magnetic flux passing through the auxiliary magnetic pole on the other side along the axial direction, compared to the reluctance torque generated on the one side. As a result, the combined torques, each representing the sum of the magnetic torque and the reluctance torque generated on either side, act to reduce the torque difference manifested by the two combined torques along the axial direction.

In contrast, the central positions taken at each pair of magnet pieces disposed one on top of the other are offsets along the circumferential direction in the undesirable positional arrangement assumed for the magnet pieces shown in FIG. 11(a). Thus, both the magnetic torques and the reluctance torques work along a matching direction in which a thrust force is generated along the axis, resulting in a significant thrust force manifesting in the axial direction. The bearings are bound to be adversely affected by this axial thrust force. In particular, the thrust force manifesting along the axial direction tends to cause a problem when an accelerating or decelerating gear is engaged with the shaft of the rotating electric machine, as the axial thrust force may alter the interlocking position at which the gear engages or the gear may be subjected to excessive force.

Figure 11:
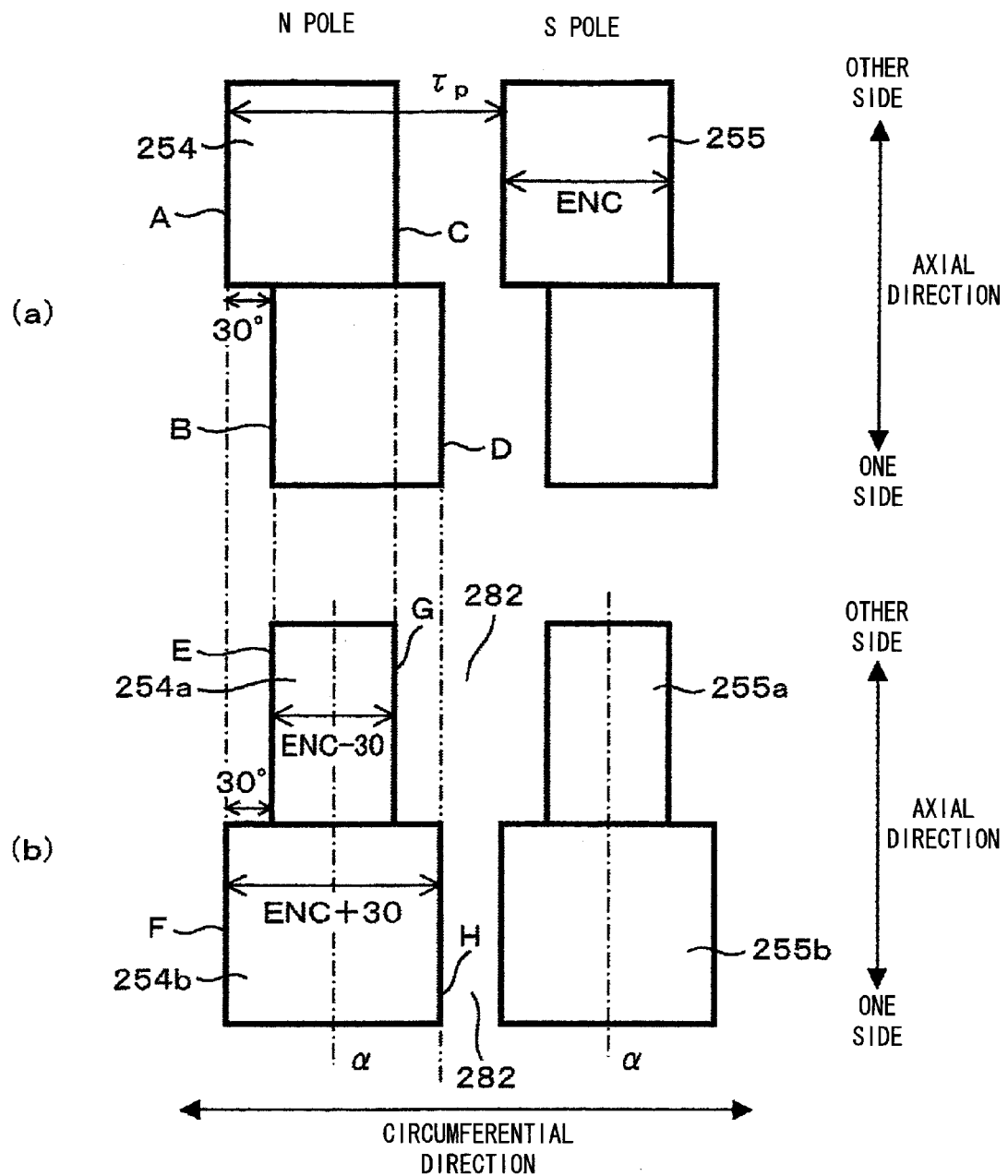
Figure 12:
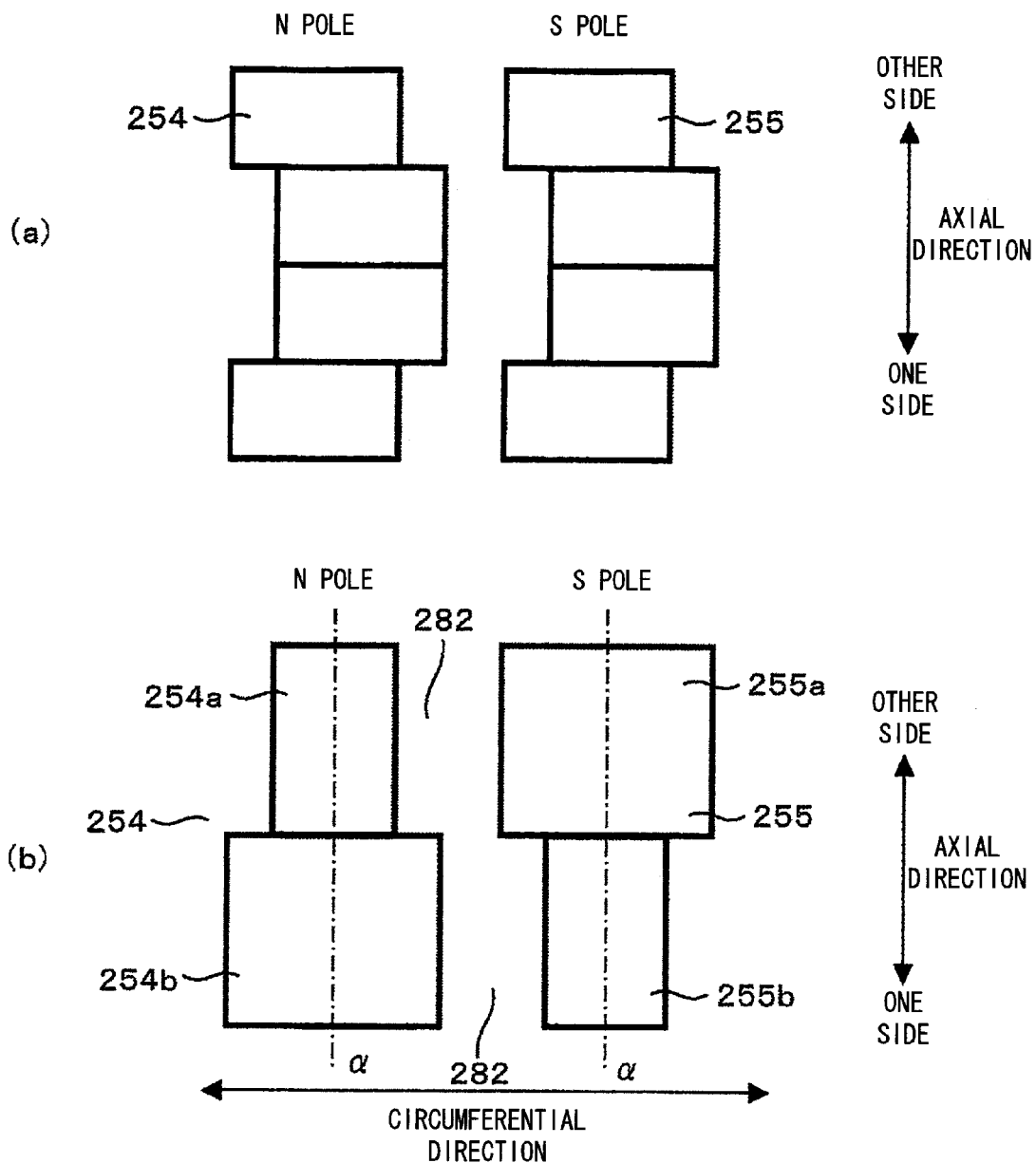

FIG. 12 shows another embodiment. FIG. 12(a) illustrates an undesirable stepped skew formation whereas FIG. 12(b) illustrates a desirable block skew formation. In the undesirable stepped skew formation described in reference to FIG. 11(a), a thrust force is generated along the axial direction. This thrust force is likely to affect the mechanical system adversely as it may offset the center of the rotor relative to the stator or the bearings may be subjected to excessive force applied along the axial direction. There is an added concern that the mechanical loss in the rotating electric machine is likely to increase.

The undesirable stepped skew formation shown in FIG. 12(a) has a function of reducing the thrust force. Namely, the permanent magnets and the auxiliary magnetic pole forming a q-axis magnetic flux circuit are each offset along the circumferential direction as it ranges from one end taken along the rotational axis toward the center of the rotational axis and then they each resume the initial position taken along the circumferential direction beyond the center of the rotational axis so as to achieve symmetry relative to the center of the rotational axis. By adopting this positional arrangement, the thrust force can be reduced. However, the arrangement is not as desirable as those shown in FIG. 11(b) and FIG. 12(b), since the magnets are each split along the axial direction into magnet pieces twice the number of magnet pieces in FIGS. 11(b) and 12(b). Although the magnets are each split into a greater number of parts, hardly any improvement is made in the torque pulsation reducing effect over those achieved by adopting the positional arrangement shown in FIGS. 11(b) and 12(b). This means that the torque pulsation reducing effect achieved with this positional arrangement may not be great enough to justify lowered productivity and an increase in the cost per unit weight due to the greater number of magnet pieces constituting each magnet.

The permanent magnet 254 is made up with two types of magnet pieces 254a and 254b and the permanent magnet 255 is made up with two types of magnetic pieces 255a and 255b in the desirable positional arrangement shown in FIG. 12(b). Lines α are central lines running through the centers of the magnet pieces 254a and 254b and the magnet pieces 255a and 255b taken along the circumferential direction, and the magnet pieces constituting each permanent magnet are disposed so that the central lines a running through the individual magnet pieces form a substantially single straight line extending along the rotational axis. In addition, the centers of the magnetic poles formed with the permanent magnets 254 and 255 are in alignment with the central lines a running through the centers of the magnet pieces. The permanent magnets in FIG. 12(b) are similar in their external appearance to the permanent magnets described earlier in reference to FIG. 7(e) and the permanent magnets in FIG. 12(b) are also disposed exactly as the permanent magnets in FIG. 7(e) are disposed so as to form magnetic poles having N polarity and S polarity.

The effect achieved with regard to torque pulsation by adopting the positional arrangement shown in FIG. 12(b) is identical to that described in reference to FIG. 11(b). The magnet pieces 254a and 255b are formed so as to range over substantially matching lengths along the circumferential direction and the magnet pieces 254b and 255a are formed so as to range over substantially matching lengths along the circumferential direction. In addition, the difference between the lengths of the magnet pieces 254a and 254b measured along the circumferential direction and the difference between the lengths of the magnet pieces 255a and 255b measured along the circumferential direction are each equivalent to 60° in electrical angle. Namely, assuming that n types of magnet pieces make up a permanent magnet, the difference between the lengths of magnet pieces constituting the permanent magnets 254 and 255 measured along the circumferential direction is set to a value equivalent to approximately 120°/n in electrical angle. With permanent magnets adopting the structure, the cogging torque can be reduced. Moreover, pulsations occurring in the reluctance torque, too, can be reduced. While forces acting along the axial direction within a single pole cannot cancel each other out, the thrust forces that would act on the rotor can be canceled out in the pair of magnets having N polarity and S polarity. In other words, the magnetic torque representing the sum of the magnetic torques attributable to the magnet pieces 254a and 255a and the magnetic torque representing the sum of the magnetic torques attributable to the magnet pieces 254b and 255b are substantially equal to each other. In addition, an auxiliary magnetic pole 282 formed between each pair of successive magnetic poles, one having N polarity and the other having S polarity, includes two sides set next to each other along the axial direction, which are offset relative to each other along the circumferential direction. Furthermore, the direction in which the two sides of a given auxiliary magnetic pole 282, among the plurality of auxiliary magnetic poles 282 formed consecutively along the circumferential direction is offset relative to each other, is the opposite of the offsetting direction in which the two sides of the immediately preceding or succeeding auxiliary magnetic pole 282 are offset. For instance, while the auxiliary magnetic pole 282, located to the right of the N pole in FIG. 12(b) is formed so that it is offset to the right along the circumferential direction as it ranges from the other side toward the one side along the axial direction the auxiliary magnetic pole 282 located to the left of the N pole in the figure, is formed so that it is offset to the left along the circumferential direction as it ranges from the other side toward the one side along the axial direction. Namely, while the auxiliary magnetic poles through which the q-axis magnetic flux passes are each formed so that the one side and the other side, set next to each other along the axial direction, are offset relative to each other along the circumferential direction, the offsetting direction is switched to the opposite for every second auxiliary magnetic pole, making it possible to cancel out the thrust force components.

The structural arrangement shown in FIG. 12(b) is more advantageous compared to that shown in FIG. 12(a) in that it requires fewer magnets. This ultimately means that since the numbers of manufacturing steps required as part of the laminating process through which the electromagnetic steel sheets are laminated one on top of another along the axial direction in order to form the rotor, as part of the magnet insertion process, as part of the rotor assembly process and the like can be greatly reduced, the manufacturing costs can be lowered.

Figure 13:
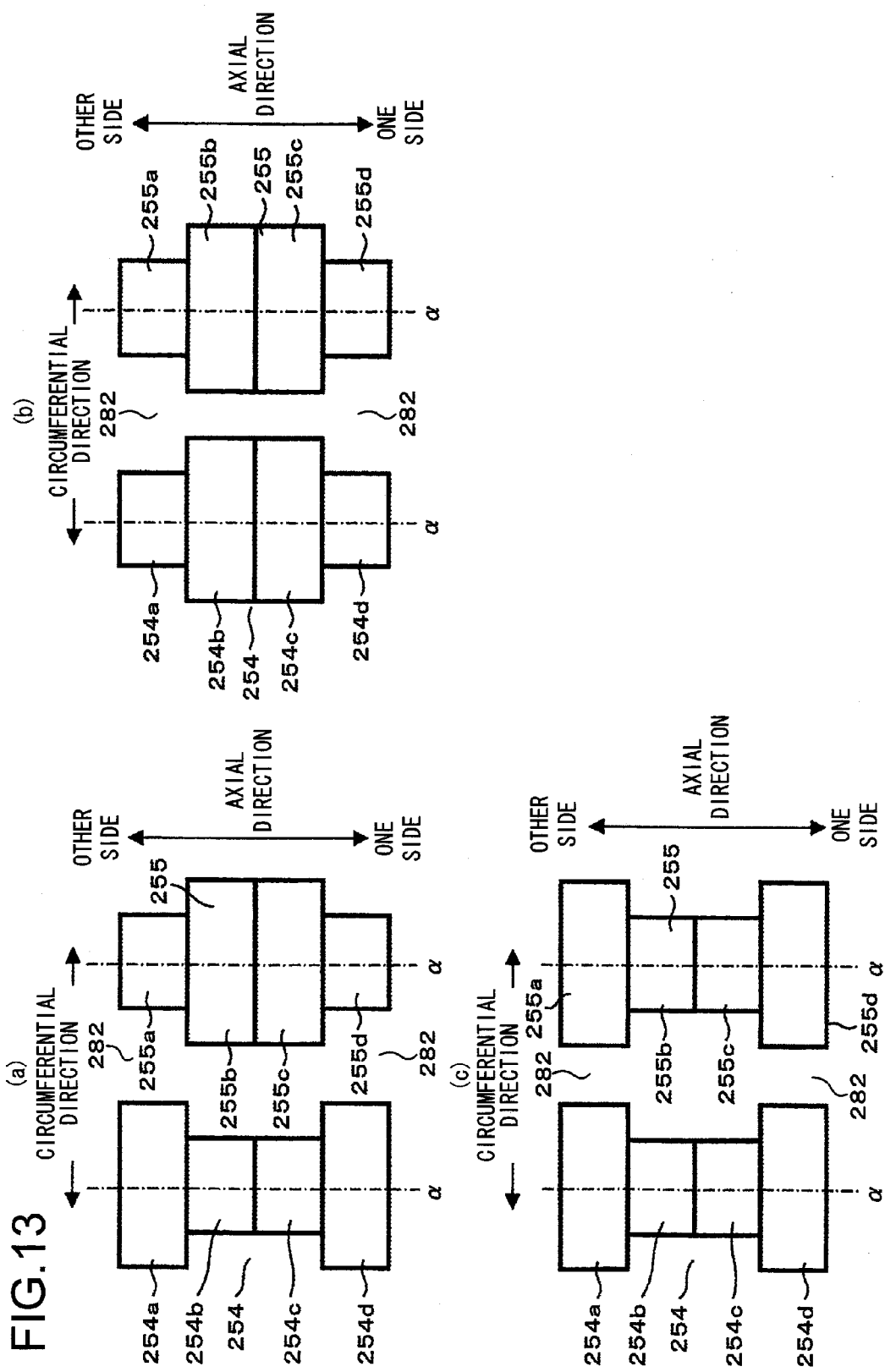

FIG. 13 presents examples of positional arrangements with which magnet pieces assuming two different lengths (n=2) along the circumferential direction may be disposed. FIG. 13(a), FIG. 13(b) and FIG. 13(c) each show a block skew variation with magnet pieces assuming desirable shapes disposed in a desirable positional arrangement. Each of these positional arrangements achieves a cogging torque canceling effect, equivalent to that achieved by adopting the two step skew formation described in reference to FIG. 12(a) as an undesirable example.

In each of the desirable variations shown in FIG. 13, the individual magnet pieces constituting a permanent magnet are disposed so that a substantially single straight line a runs along the axial direction through the centers of the magnet pieces. In addition, since the permanent magnets is formed in a shape substantially achieving symmetry with regard to the one side and the other side ranging next to each other along the axial direction, the rotor is subjected to hardly any thrust force attributable to the magnetic torque. Assuming that there is no manufacturing error, in theory, there will be no thrust force. Furthermore, assuming that there is no manufacturing error, the structure does not allow any thrust force attributable to the reluctance torque to occur along the axial direction.

While the magnet insertion holes at which the magnet pieces are inserted are not mentioned in the description given in reference to FIG. 11(b), FIG. 12(b) and FIGS. 13(a) through 13(c), the magnet insertion holes at which the magnet pieces are to be inserted are formed at each of the electromagnetic steel sheets to constitute the rotor core in a size slightly larger than the external dimensions of the magnet pieces. The magnet insertion holes are formed slightly larger than the external dimensions of the various magnet pieces so as to facilitate the magnet piece insertion process.

As do the structural examples presented in FIG. 11(b) and FIG. 12(b), the variations shown in FIGS. 13(a) through 13(c) each include an auxiliary magnetic pole 282 formed between the magnet pieces 254a through 254d constituting a permanent magnet 254 having N polarity and magnet pieces 255a through 255d constituting a permanent magnet 255 having S polarity.

The permanent magnets shown in FIG. 11(b), FIG. 12(b) and FIGS. 13(a), 13(b) and 13(c) are each formed by combining magnet pieces assuming two different lengths (i.e., n=2) along the circumferential direction. When there are n different lengths along the circumferential direction, the difference between the various lengths taken along the circumferential direction is equivalent to 120°/n in electrical angle. n is an integer equal to or greater than 2. In the variations described above, two different lengths are assumed along the circumferential direction for the magnet pieces constituting each permanent magnet. In other words, n is 2 in the variations. Thus, 120°/n is calculated to be 120°/2, indicating that the difference between the lengths taken along the circumferential direction is equivalent to 60° in electrical angle.

The permanent magnets formed in the embodiments shown in FIGS. 13(*a*), 13(*b*) and 13(*c*) are each made up with four magnet pieces 254*a* to 254*d* or 255*a* to 255*d* and two different lengths (n=2) are assumed for these magnet pieces along the circumferential direction. The magnet pieces 254*a*, 254*b*, 254*c* and 254*d* or the magnet pieces 255*a*, 255*b*, 255*c* and 255*d* are disposed along the axial direction from the other side toward the one side of the axis. The two magnet pieces 254*b* and 254*c* located in the central area along the axial direction are identical to each other in shape, and the two magnet pieces 255*b* and 255*c* located in the middle area along the axial direction are also identical to each other in shape. Thus, since the pair of magnet pieces 254*b* and 254*c* and the pair of magnet pieces 255*b* and 255*c* can each be prepared as a single integrated magnet piece, the overall number of magnet pieces can be reduced, which, in turn, may lead to improved productivity.

Among the embodiments described thus far, the structural arrangements shown in FIG. 11(*b*) and FIG. 12(*b*) require fewer magnet pieces compared to those shown in FIGS. 13(*a*), 13(*b*) and 13(*c*) and thus, the structural examples presented in FIGS. 11(*b*) and 12(*b*) assure better productivity. In addition, since the internal shape of the magnet insertion holes formed at the rotor core substantially matches the external shape of the magnet pieces in the structural examples presented in FIG. 11(*b*) and FIG. 12(*b*), the structural arrangements shown in FIG. 11(*b*) and FIG. 12(*b*) allow the rotor core to be machined with better ease compared to the structural arrangements shown in FIGS. 13(*a*), 13(*b*) and 13(*c*). Furthermore, since the magnet pieces can be inserted at the magnet insertion holes in the rotor core 252 in a fully assembled state, better productivity is also assured with regard to magnet piece insertion.

The various magnet pieces shown in FIGS. 13(*a*) through 13(*c*) assume a uniform length along the axial direction so as to assure superior magnet productivity when manufacturing neodymium-based or samarium/cobalt-based sintered magnets.

The magnet pieces 254*a* and 254*d* or the magnet pieces 255*a* and 255*d*, located toward the two ends of the rotational axis in FIG. 13(*b*), amount to a relatively small magnet quantity, whereas the magnet pieces 254*b* and 254*c* or the magnet pieces 255*b* and 255*c*, located over the central area along the rotational axis, amount to a larger magnet quantity. This means that a greater magnetic torque is imparted over the central area along the axial direction and less magnetic torque is imparted toward the two ends along the axial direction. Since the extent of magnetic flux leakage tends to be lower in the central area along the rotational axis compared to the extent of magnetic flux leakage manifesting on the two sides in a rotor with built-in magnets, the structural design shown in FIG. 13(*b*) is more effective than the structural design shown in FIG. 13(*c*). The structure shown in FIG. 13(*b*) is most effective, the structure shown in FIG. 13(*a*) is the second most effective and the structure shown in FIG. 13(*c*) is the least effective in reducing the magnetic flux leakage from the ends of the rotor facing opposite each other along the axial direction.

Figure 14:
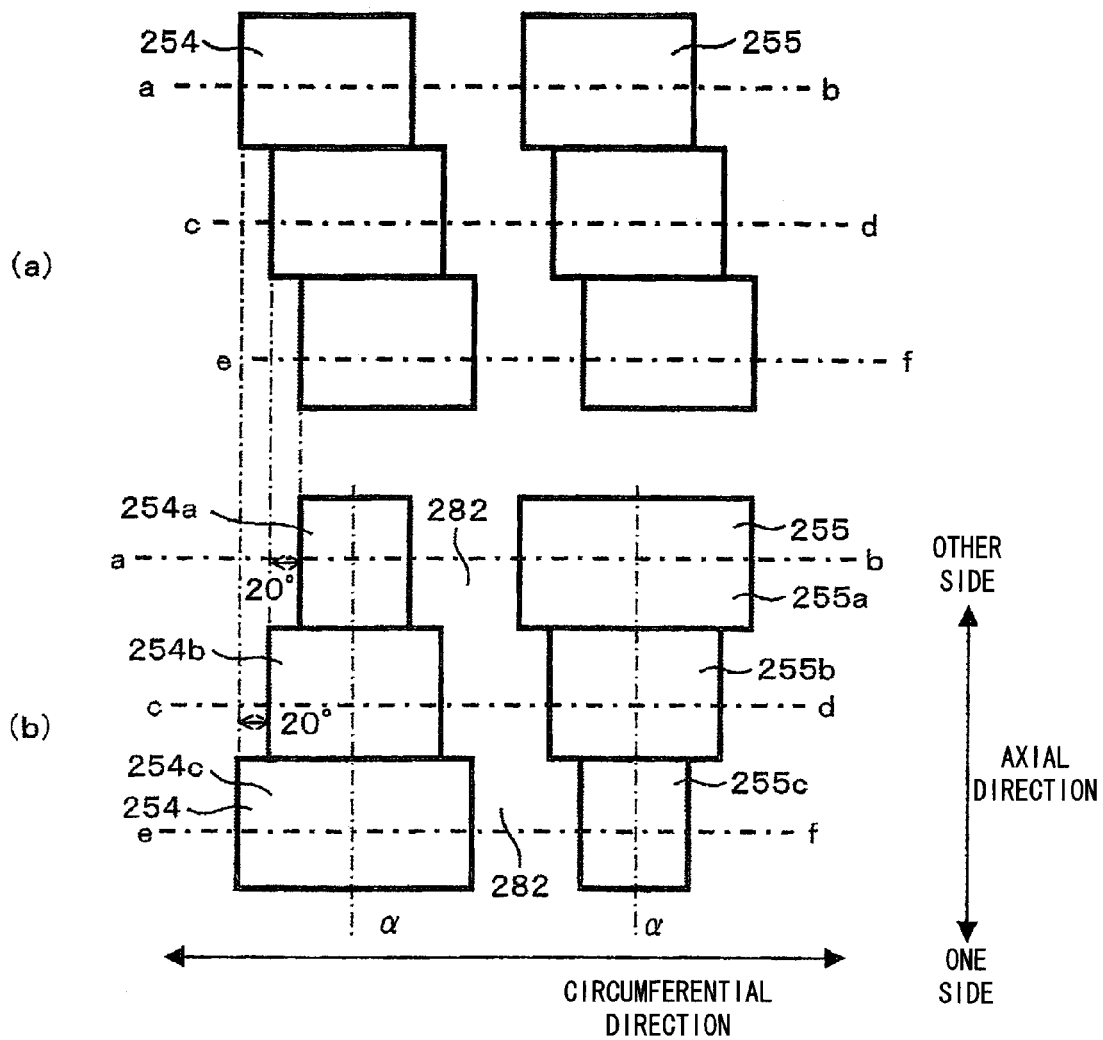
Figure 15:
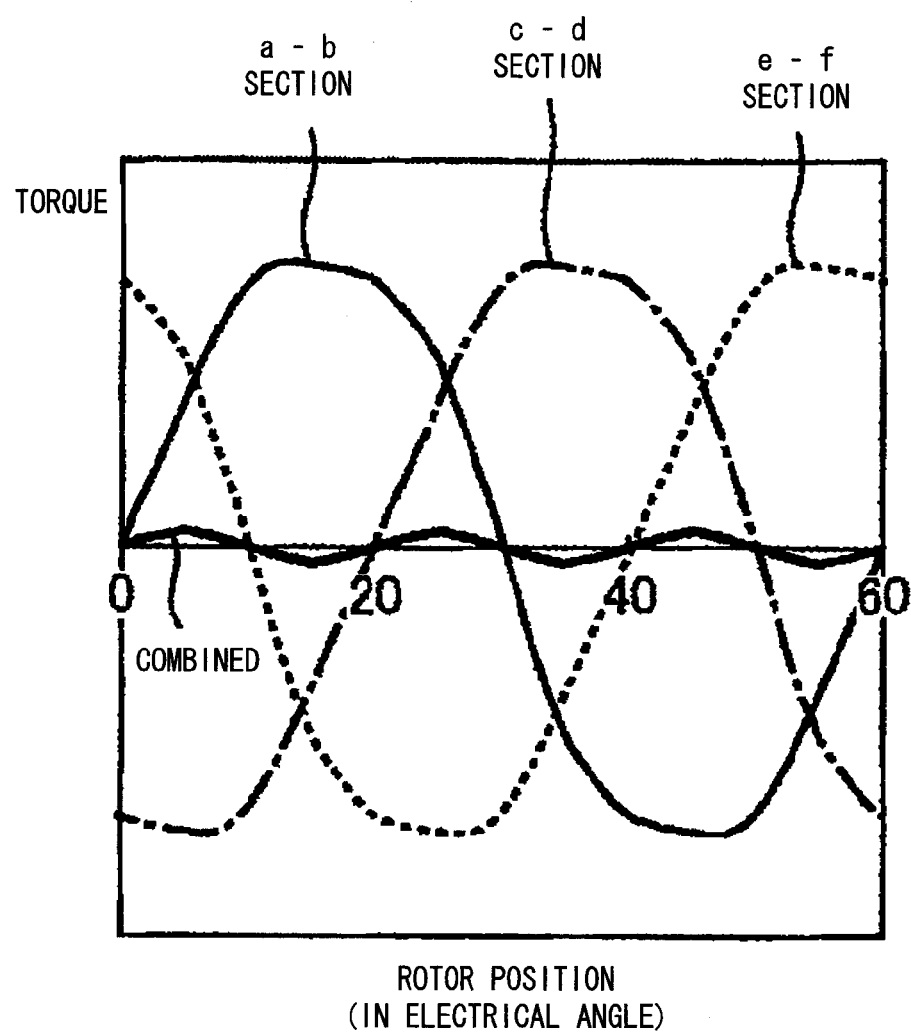

The shapes of the magnetic poles and the auxiliary magnetic poles in FIG. 14(*a*) and FIG. 14(*b*) are determined by the structures of the permanent magnets each made up with three types of magnet pieces ranging over different lengths along the circumferential direction and by the positional arrangements with which the permanent magnets are disposed. In the structural example presented in FIG. 14(*b*), the permanent magnets are each made up with magnet pieces assuming three different lengths along the circumferential direction and the difference in the length calculated as 120°/n with n at 3, is 120°/3=40° in electrical angle, achieving reduced torque pulsation, as indicated in FIG. 15. By allowing the magnet pieces to assume a greater number of different lengths along the circumferential direction, as in this embodiment, torque pulsations of higher orders, too, can be eliminated, and thus, a superior torque pulsation reducing effect is achieved. In the undesirable structural example presented in FIG. 14(*a*), on the other hand, the centers of the various magnet pieces, assumed along the circumferential direction, are not aligned on a single straight line running along the rotor axis. For this reason, the structural design, which does achieve a torque pulsation reducing effect, is less than desirable since thrust forces are bound to be imparted along the rotational axis.

In the desirable structural arrangement shown in FIG. 14(*b*), the permanent magnet 254 is made up with a magnet piece 254*a*, a magnet piece 254*b* and a magnet piece 254*c*, and central lines a running through the centers of the magnet pieces 254*a*, 254*b* and 254*c*, each taken along the circumferential direction, are in alignment with one another. In this embodiment, a magnetic pole is formed with a single permanent magnet and thus, the central line running through the center of the magnetic pole is substantially in alignment with the central lines a each running through the center of a magnet piece. It is to be noted that the order in which the magnet piece 254*a*, the magnet piece 254*b* and the magnet piece 254*c* are disposed along the rotational axis may be reversed, and such an alternative positional arrangement, too, will assure advantages similar to those achieved through the positional arrangement shown in FIG. 14(*b*).

In the structural arrangement shown in FIG. 14(*b*) the central lines $\alpha$ running through the centers of the individual magnet pieces assumed along the circumferential direction are in alignment with one another, thereby forming a single straight line. Thus, the thrust forces acting along the rotational axis in a pair of magnetic poles one having N polarity and the other having S polarity cancel each other out, and as a result, hardly any thrust force occurs along the axial direction. In addition, since each auxiliary magnetic poles 282 is formed so as to shift along the circumferential direction by 20° in electrical angle at a time, pulsations attributable to the reluctance torque generated based upon the auxiliary magnetic pole 282 are reduced. Furthermore, while the plurality of auxiliary magnetic poles 282, formed one after another along the circumferential direction, each assume a shape inclining along the circumferential direction, the direction of inclination is alternately switched. As a result, thrust force components attributable to the reluctance torque cancel each other out and thus, hardly any thrust component manifests in the rotor as a whole.

While the embodiment shown in FIG. 14(*b*) achieves an advantage similar to that of the embodiments shown in FIG. 13 in that the cogging torque component with a 60° cycle in electrical angle is mostly eliminated, the cogging torque with a cycle half the cycle of the cogging torque component eliminated through the embodiments shown in FIG. 13, i.e., a 30° cycle, is also eliminated through the embodiment shown in FIG. 14(*b*), thereby achieving an even greater torque pulsation reducing effect.

The side surfaces of the magnet pieces that face opposite each other on each side along the circumferential direction over an a-b section, are offset by 20° in electrical angle relative to the side surfaces of the magnet pieces that face opposite each other over a c-d section and the magnet pieces that face opposite each other over an e-f section, which, in turn, are offset from each other by 20° in electrical angle on each side, in the structural arrangement shown in FIG. 14(*b*).

As a result, the waveform of the overall cogging torque is equivalent to the combination of the individual waveforms, offset relative to each other by 20°, as shown in FIG. 15. In this case, while the torque pulsation component of a 3 nth order (n is an integer) is not canceled, pulsations of the first order and the second order are eliminated, thereby achieving a further reduction in torque pulsation compared to the torque pulsation reduction shown in FIG. 10, achieved by adopting a structure in which the side surfaces of one magnet piece facing opposite each other along the circumferential direction are offset by 30° in electrical angle relative to the side surfaces of another magnet piece.

Figure 16:
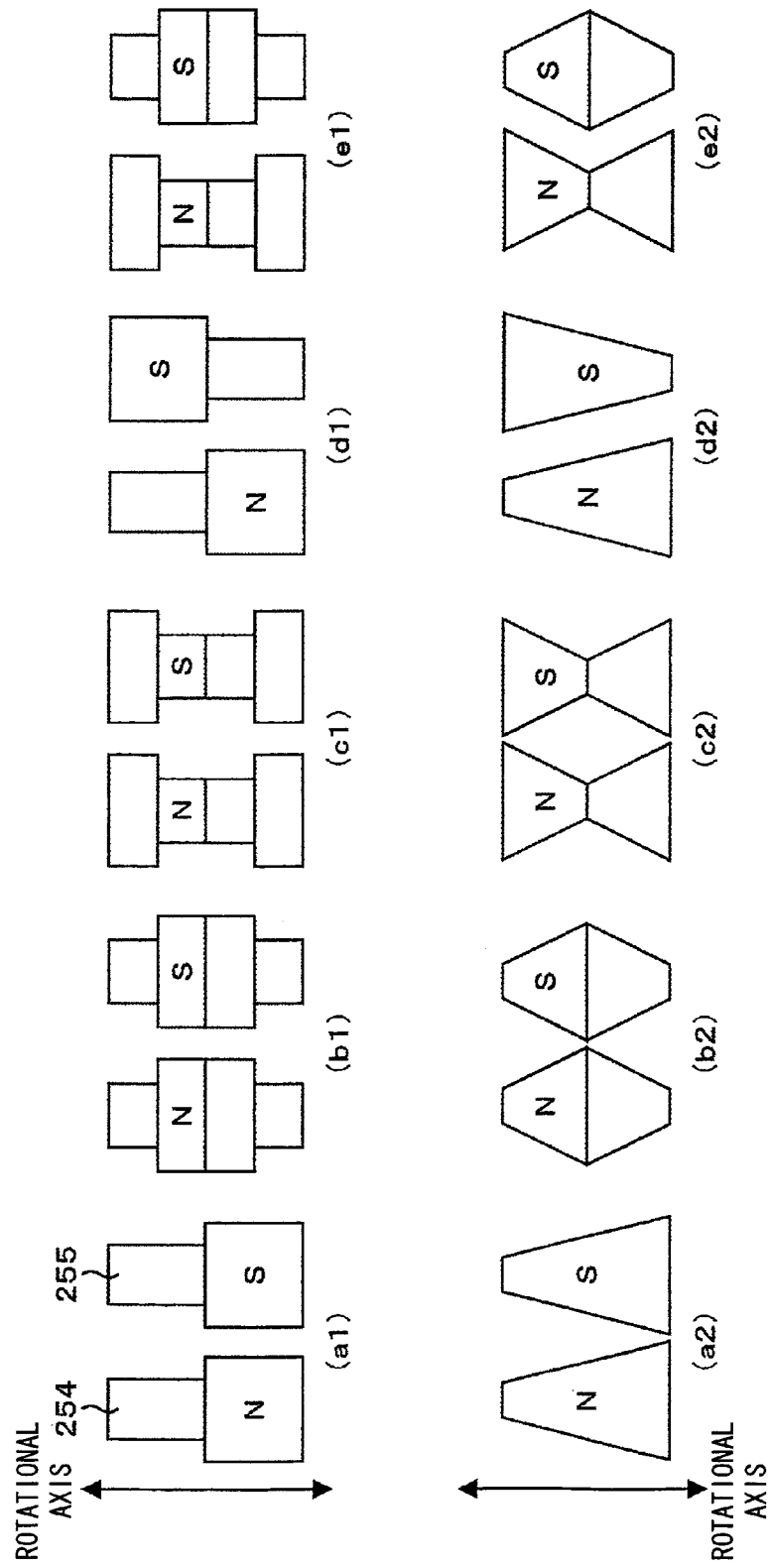
FIG. 16 Variations in the shapes and positions of magnet pieces used to achieve skews with trapezoidal magnets FIG. 17 Illustrations of other embodiments of the present invention FIG. 18 Illustrations of an embodiment achieved by using trapezoidal magnets FIG. 19 Illustrations of other embodiments achieved by using trapezoidal magnets FIG. 20 Illustrations of an embodiment achieved by using trapezoidal magnets FIG. 21 Illustrations of embodiments achieving a reduction in the magnetic flux leakage from embedded magnets FIG. 22 Illustrations of other embodiments achieving a reduction in the magnetic flux from embedded magnets FIG. 23 Illustrations of another embodiment achieving a reduction in the magnetic flux leakage from trapezoidal embedded magnets FIG. 24 An illustration of a stator winding adopting a fractional pitch winding system FIG. 25 A system configuration diagram pertaining to a rotating electric machine cooling system FIG. 26 An illustration of a magnetizing coil with an undesirable shape FIG. 27 Illustrations of magnetizing coils with desirable shapes

FIGS. 16(*a*1) through 16(*e*1) show block skew variations. Cogging torque components are canceled out by each other with magnet pieces disposed as shown in any of the variations. In addition, the magnet pieces used in each variation are disposed so as to achieve symmetry relative to the straight line running along the axial direction by passing through the center of each magnet piece, assumed along the circumferential direction. As a result, an advantage is achieved with the combined torque, representing the sum of the magnetic torque and the cogging torque, attributable to the specific structure adopted in each permanent magnet or attributable to N pole/S pole torque integration, in that the rotor is not subjected to any significant thrust force.

Torque pulsations of higher orders can be eliminated by increasing the number n of magnet piece types used in conjunction with the structural arrangements shown in FIG. 16(*a*1) through 16(*e*1). FIG. 16(*a*2) through 16(*e*2) show structural designs with which torque pulsations of higher orders can be reduced. The block skew formations, each made up with two different types of magnetic pieces, as shown in FIG. 16(*a*1) through 16(*e*1) can be modified by replacing the two different types of magnet pieces with a single type of trapezoidal (isosceles trapezoid) permanent magnet or magnet piece, as shown in FIG. 16(*a*2) through 16(*e*2). In the following description, such a trapezoidal structure will be referred to as a trapezoidal skew formation. For instance, the shape of each permanent magnet shown in FIG. 16(*a*2) is equivalent to that achieved by inclining, i.e., skewing, the left side and the right side of the bottom magnet piece in FIG. 16(*a*1) inward by an extent equivalent to 30° in electrical angle and by skewing the left side and the right side of the top magnet piece inward by an extent equivalent to 30° in electrical angle. It is assumed that the lengths of the sides of the individual magnet pieces in FIG. 16(*a*1) extending along the axial direction are equal to each other. Likewise, each trapezoidal magnet piece on the top side in FIG. 16(*b*2) corresponds to a block skew unit made up with the first and second magnet pieces from the top in FIG. 16(*b*1), whereas each trapezoidal magnet piece on the bottom side in FIG. 16(*b*2) corresponds to a block skew unit made up with the third and fourth magnet pieces from the top in FIG. 16(*b*1). In both FIG. 16(*a*) and FIG. 16(*b*), the difference between the length of the upper base and the length of the lower base of the trapezoid is equivalent to 120° in electrical angle. A distinctive advantage of the structures shown in FIG. 16(*a*2) to FIG. 16(*e*2) is that cogging torque of higher orders can be reduced without having to split a given magnet along the axial direction into any more than two pieces. In an oblique skew formation achieved by using a trapezoidal magnet, cogging torque components of higher orders equal to or greater than the skew angle should be completely canceled out in theory. Furthermore, as in the embodiments described earlier, the magnet pieces are built into and held securely within the rotor core, with an auxiliary magnetic pole formed between a magnet piece forming a given magnetic pole and the magnet piece forming the next magnetic pole. As a result, the sides of the auxiliary magnetic poles facing opposite each other along the circumferential direction, too, are inclined, thereby achieving an advantage in that torque pulsations of higher orders attributable to the reluctance torque, too, can be effectively reduced.

Structural features characterizing the structural arrangements shown in FIGS. 16(*b*1) and 16(*b*2) are now described. In these two embodiments, each permanent magnet made up with a plurality of magnet pieces assume a smaller length at its ends facing opposite each other along the axial direction, i.e., the length of the top side and the bottom side of the permanent magnet in the figure is smaller than the length over which the permanent magnet ranges along the circumferential direction through its center taken along the axial direction. This means that the magnet quantity over the central area assumed along the axial direction is significant. At the ends facing opposite each other along the axial direction, magnetic flux leakage tends to occur more readily. In a motor with permanent magnets structured as shown in, for instance, FIG. 16(*e*1) or 16(*e*2), the length of the N pole ends and the length of the S pole ends do not match and, as a result, a greater extent of magnetic flux leakage occurs at the N pole compared to the extent of magnetic flux leakage occurring at the S pole. Under these circumstances, an asymmetrical condition tends to occur readily between the N pole and the S pole, which, in turn, is bound to cause low order torque ripple. In addition, the extent of magnetic flux leakage occurring at the ends facing opposite each other along the axial direction tends to be greater in the embodiments shown in FIGS. 16(*c*1) and 16(*c*2) compared to the extent of magnetic flux leakage occurring at the ends facing opposite each other along the axial direction in the embodiments shown in FIGS. 16(*b*1) and 16(*b*2). Thus, the efficiency of a rotating electric machine adopting the structure shown in either FIG. 16(*c*1) or FIG. 16(*c*2) tends to be compromised more readily. For this reason, the magnet arrangements shown in FIGS. 16(*b*1) and 16(*b*2), assuring less magnetic flux leakage and good symmetry, are particularly ideal for rotating electric machine applications.

Figure 17:
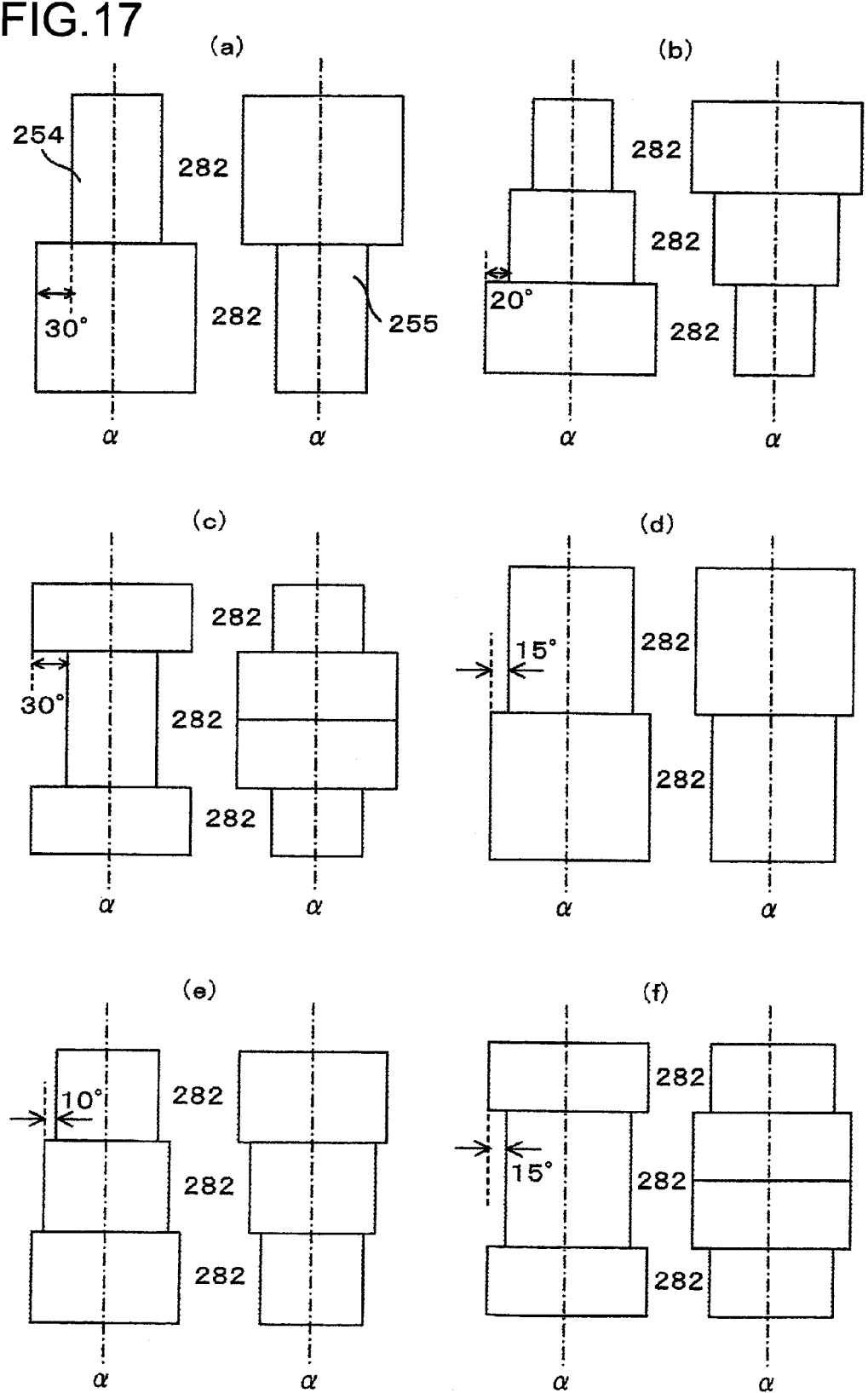

The two types of magnet pieces used in the structural examples shown in FIG. 17(*a*) and FIG. 17(*c*) range along the circumferential direction over lengths manifesting a difference equivalent to 60° in electrical angle, as has been described in reference to FIGS. 11 and 12. In addition, each two types of magnet pieces disposed consecutively, among the three types of magnet pieces arranged as shown in FIG. 17(*b*) range along the circumferential direction over lengths manifesting a difference equivalent to 40° in electrical angle, as has been described in reference to FIG. 14. In other words, a skew formation achieved by using n different types of magnet pieces include the n types of magnet pieces manifesting a difference in the length, measured along the circumferential direction, equivalent to 120°/n in electrical angle, which are disposed one after another along the axial direction. The waveforms of the cogging torque components manifesting in such a block skew formation have already been described in reference to FIG. 15. While there still remains the cogging torque component with a 20° cycle in electrical angle, the cogging torque components with the 60° cycle in electrical angle and the cogging torque component with the 30° cycle in electrical angle are reduced as has been explained in reference to FIG. 15. It is to be noted that the 20° cycle in electrical angle is equivalent to the component of the 18th order in time relative to the power source frequency.

The structural examples shown in FIGS. 17(*d*), 17(*e*) and 17(*f*) are similar to those shown in FIGS. 17(*a*), 17(*b*) and 17(*c*) except that the differences between the lengths of the magnet pieces, measured along the circumferential direction, are reduced to half the differences in FIGS. 17(a), 17(b) and 17(c). In the structural arrangements shown in FIGS. 17(d) and 17(f), the difference between the lengths of the two types of magnet pieces, measured along the circumferential direction, is equivalent to 30° in electrical angle, whereas in the structural arrangement shown in FIG. 17(e) achieved in conjunction with three different types of magnet pieces, the difference between the lengths of each two magnet pieces disposed next to each other measured along the circumferential direction, is equivalent to 20° in electrical angle. As a result, the cogging torque components with the 30° cycle in electrical angle can be canceled out. These structures are equally effective in reducing reluctance torque pulsations as well as reducing the magnetic torque pulsations. Namely, by adopting either of the structures shown in FIGS. 17(d) and 17(f), torque pulsations attributable to the 12th-order torque component can be reduced, whereas the structural arrangement shown in FIG. 17(e) is effective in reducing torque pulsation attributable to the 12th-order torque component and the 24th-order torque component.

The cycles of cogging torque components manifesting in a three-phase motor are equivalent to 60°, 30° and 15° in electrical angle, which respectively correspond to the sixth order, the twelfth order and the 18th order in time relative to the power source fundamental frequency. In other words, a 6 nth-order component with a (360/6n)° cycle, i.e., a 60/n° cycle, manifests as a cogging torque or a torque ripple. In the embodiments, the 12th-order torque pulsations alone are eliminated without canceling out the sixth-order torque pulsations in a motor manifesting a more significant twelfth order cogging torque component in time compared to the sixth order cogging torque component in time. At such a motor, the cogging torque with the 30° cycle can be eliminated by adopting any of the block skew formations shown in FIGS. 17(d), 17(e) and 17(f). These embodiments are advantageous in that the torque does not decrease significantly. While the torque normally tends to decrease significantly when the skew angle is large, the torque reduction can be lessened by adopting any of the positional arrangements shown in the figures in conjunction with the magnet pieces structured as described above.

Figure 18:
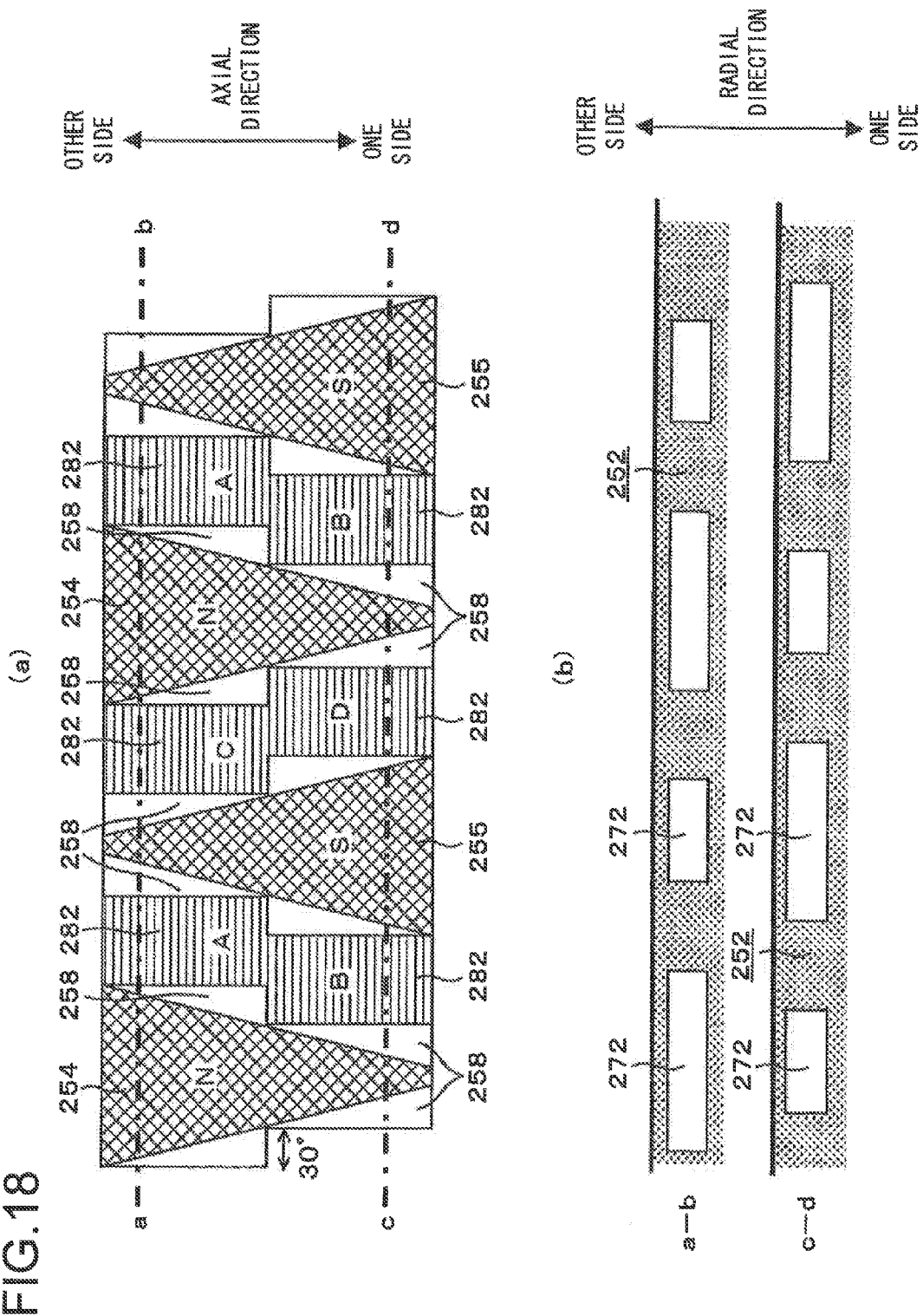
Figure 19:
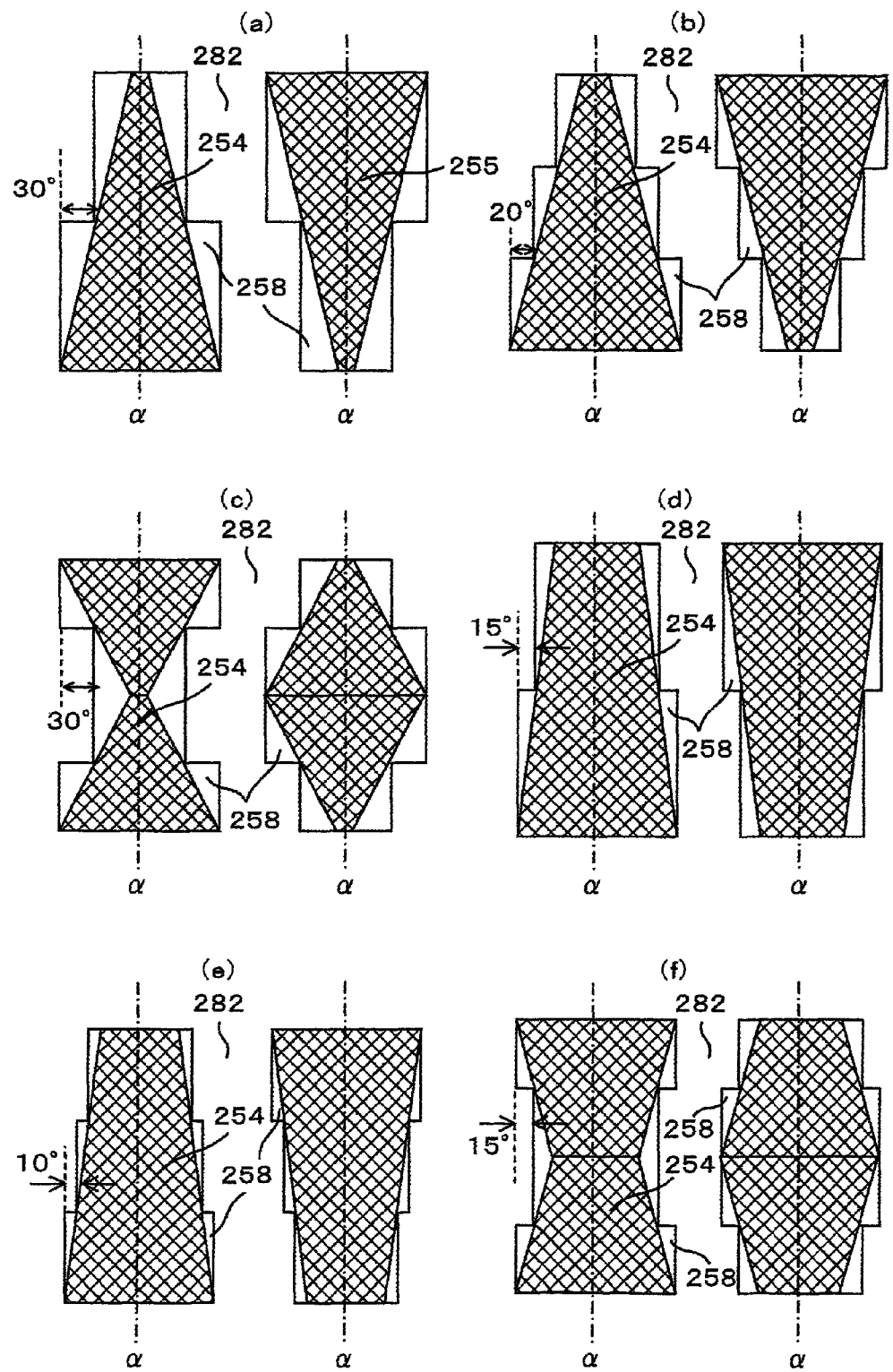

FIG. 18 presents another embodiment. The shape of the space inside the magnet insertion holes formed at the core, at which magnets are fitted, does not need to exactly match the shape of the magnet pieces. In the embodiments described in reference to FIGS. 11 through 14 and FIG. 17, the magnet pieces are each formed in a rectangular parallelepiped shape and the magnet insertion holes to house the rectangular parallelepiped magnet pieces have an internal space slightly larger than the magnet pieces so as to allow the magnet pieces to be inserted with ease. The embodiment shown in FIG. 18 is unique in that the permanent magnets 254 and 255 are each made up with a single magnet piece.

As shown in FIG. 18(a), the permanent magnets 254 and 255 assume a substantially trapezoidal shape (isosceles trapezoid), viewed from the stator side, with the lengths of the upper base and the lower base of the trapezoid, located at the two ends facing opposite each other along the rotational axis of the rotor 250 manifesting a difference equivalent to 120° in electrical angle. Magnet insertion holes 272 at which the permanent magnets 254 and 255 are to be inserted are formed by laminating a plurality of electromagnetic steel sheets, each having substantially rectangular holes formed therein, one on top of another. The magnet insertion holes 272 in the embodiment are each formed in two stages set next to each other along the rotor axis. The sidewalls of the bottom-side hole (housing a permanent magnet 254) in the figure are each offset inward by 30° in electrical angle and the holes formed in the two stages range along the circumferential direction over lengths manifesting a difference equivalent to 60° in electrical angle. FIG. 18(b) shows the shape of the magnet insertion holes 272 at the rotor core 252, viewed from the rotational axis. An a-b section and an c-d section taken at the positions respectively indicated by the one-point chain line a-b and the one-point chain line c-d in FIG. 18(a) are notated as a-b and c-d respectively in FIG. 18(b).

In this embodiment, the a-b section and the c-d section are offset relative to each other by an extent equivalent to a single magnetic pole. Viewed from the rotational axis, the magnetic poles and the auxiliary magnetic poles formed at the rotor core achieve rotational symmetry and thus, if the electromagnetic steel sheets are laminated one on top of another with an offset equivalent to a single pole, the auxiliary magnetic poles B and D are set with an offset equivalent to 30° in electrical angle relative to the auxiliary magnetic poles A and C in FIG. 18(a). The electromagnetic steel sheets with magnet insertion holes formed in matching shapes can be used to form two-stage auxiliary magnetic poles in the embodiment. By assembling the electromagnetic steel sheets with magnet insertion holes with matching shapes formed therein with an offset along the circumferential direction, auxiliary magnetic poles 282A and 282B to function as auxiliary magnetic poles can be formed as shown in FIG. 18(a). As the permanent magnets 254 and 255 are inserted in the magnet insertion holes, air gaps 258, to act as magnetic voids are each formed between an auxiliary magnetic pole 282A and the closest permanent magnet 254 or between an auxiliary magnetic pole 282B and the closest permanent magnet 255. The plurality of auxiliary magnetic poles 282, inclining along the circumferential direction, are formed one after another along the circumferential direction by alternately switching the inclining direction with a uniform angle of inclination, achieving an advantage in that no thrust force attributable to the reluctance torque is generated along the axial direction.

As described above, the rotor core can be constituted with electromagnetic steel sheets of a single type, formed identically to each other, which are rotated along the circumferential direction in order to form the auxiliary magnetic poles 282A and 282B. In this case, since a single die can be used when blanking the electromagnetic steel sheets, the manufacturing cost can be reduced. In addition, since the structure does not include magnets split along the axial direction, a smaller quantity of magnets is required, which, in turn, helps reduce the number of steps to be followed when embedding the magnets in the rotor.

Through this embodiment, achieved in conjunction with trapezoidal permanent magnets 254 and 255, cogging torque components of even higher orders generated at the permanent magnets can be substantially canceled out. At the same time, one side and the other side of each auxiliary magnetic pole 282 constituted of the core material present between magnetic poles, facing opposite each other along the rotational axis, are offset relative to each other along the circumferential direction by 30° in electrical angle. While reluctance torque is bound to occur at the auxiliary magnetic poles, the reluctance torque generated at such an auxiliary magnetic pole will also manifest torque pulsations with a 30° offset. The portion A and the portion B of an auxiliary magnetic pole 282 in FIG. 18 are offset relative to each other by 30°, and thus, torque pulsations with the 60° cycle can be canceled out. The portions C and D of an auxiliary magnetic pole, too, are offset relative to each other, making it possible to cancel out torque pulsations with the 60° cycle. Since the overall torque pulsations occurring in a motor with magnets embedded therein represent the combination of magnetic torque pulsations and reluctance torque pulsations, magnetic torque pulsations of higher orders can be eliminated by adopting the embodiment while the 6th-order reluctance torque pulsation alone can be eliminated through the embodiment.

Just as trapezoidal skew formations can be achieved as shown in FIG. 16 in correspondence to the block skew formation illustrated in FIG. 11(b), FIG. 12(b) and FIG. 13, trapezoidal skew formations can be achieved as shown in FIGS. 19(a) through 19(f) in correspondence to the block skew formations illustrated in FIGS. 17(a) through 17(f) respectively. The arrangements shown in FIGS. 19(a), 19(b) and 19(c) corresponding to those shown in FIGS. 17(a) through 17(c) respectively, achieve advantages similar to those of the embodiments shown in FIGS. 17(a) through 17(c) with regard to torque pulsations. Furthermore, the structural designs shown in FIGS. 19(a) through 19(c) each feature a trapezoidal skew formation, so as to reduce torque pulsations of higher orders as well. The arrangements shown in FIGS. 19(d), 19(e) and 19(f), corresponding to those shown in FIGS. 17(d) through 17(f) respectively, achieve advantages similar to those of the embodiments shown in FIGS. 17(d) through 17(f) with regard to torque pulsations. Furthermore, the structural designs shown in FIGS. 19(d), 19(e) and 19(f) each feature a trapezoidal skew formation, so as to reduce torque pulsations of higher orders as well. The trapezoidal permanent magnets and magnet pieces in FIGS. 19(a), 19(b) and 19(c) each manifest a difference between the length of the upper base and the length of the lower base of the trapezoidal, measured along the circumferential direction, which is equivalent to 120° in electrical angle. The trapezoidal permanent magnets and magnet pieces in FIGS. 19(d), 19(e) and 19(f), on the other hand, each manifest a difference between the length of the upper base and the length of the lower base of the trapezoidal, measured along the circumferential direction, which is equivalent to 60° in electrical angle.

FIG. 20(a) provides a three-dimensional illustration of a positional arrangement adopted in conjunction with trapezoidal permanent magnets. It shows a permanent magnet 254 having N polarity at its surface facing toward the stator and a permanent magnet 255 having S polarity at its surface facing toward the stator, disposed alternately to each other, with an auxiliary magnetic pole 282 formed between each pair of permanent magnets disposed next to each other. It is to be noted that while the permanent magnets 254 and 255 are embedded in the rotor core, the illustration does not show the rotor core.

Figure 20:
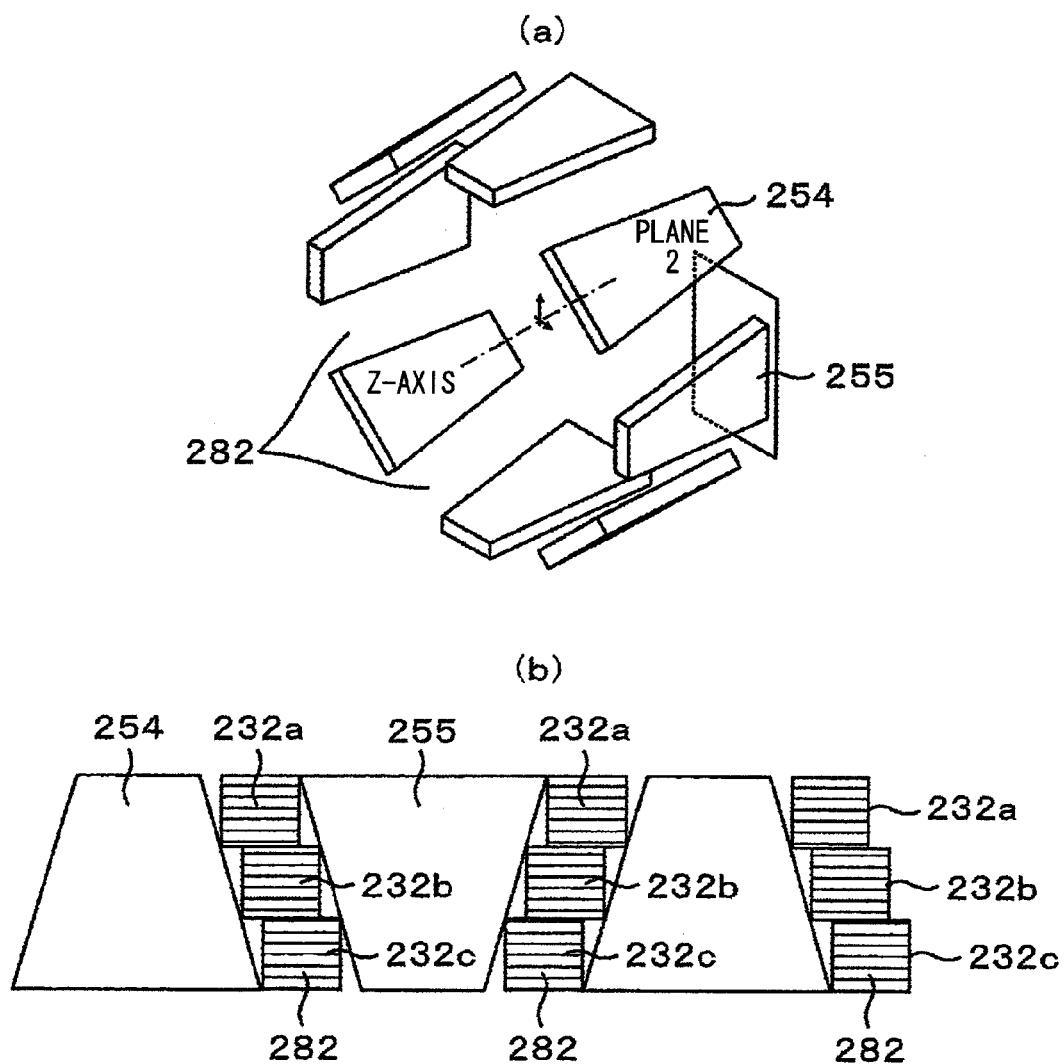

FIG. 20(b) is a sectional view taken from the stator side. While the permanent magnets 254 and 255 are disposed inside the rotor core, FIG. 20(b) shows them in a sectional view taken at a predetermined depth measured from the rotor surface, at which the permanent magnets are embedded. The embodiment shown in FIG. 20 may be adopted in conjunction with the skew formation shown in FIG. 19(e), and the sectional view in FIG. 20(b) indicates the relationship between the magnets arranged as shown in FIG. 19(e) and the rotor core at which the auxiliary magnetic poles are formed. While the basic structure of the permanent magnets shown in FIG. 19(b) is basically identical to the structure of the permanent magnets shown in FIG. 19(e), the permanent magnets 254 and 255 in FIG. 19(b) manifest a difference between the longer side and the shorter side, located at the two ends facing opposite each other along the rotational axis, expressed in electrical angle, which is different from the difference manifested by the longer side and the shorter side of the permanent magnets 254 and 255 in FIG. 19(e). Auxiliary magnetic poles with three-stage offsets, such as those shown in FIGS. 19(b) and 19(e), too, can be formed without having to use numerous types of electromagnetic steel sheets, as has been explained in reference to FIG. 18. Namely, the rotor core portions 232(a) and 232(c) are set along by assuming varying positional angles along the circumferential direction with the magnetic poles and the auxiliary magnetic poles achieving rotational symmetry in the embodiment. This means that the rotor core can be formed with electromagnetic steel sheets with magnet insertion holes formed therein in a uniform shape through press machining executed by using a single die. As a result, the manufacturing cost can be reduced. Through this embodiment, magnetic torque pulsations of higher orders can be reduced and, at the same time, the torque pulsations attributable to the reluctance torque can be reduced to a greater extent compared to the extent of torque pulsation reduction achieved in conjunction with magnet insertion holes split into two stages.

Figure 21:
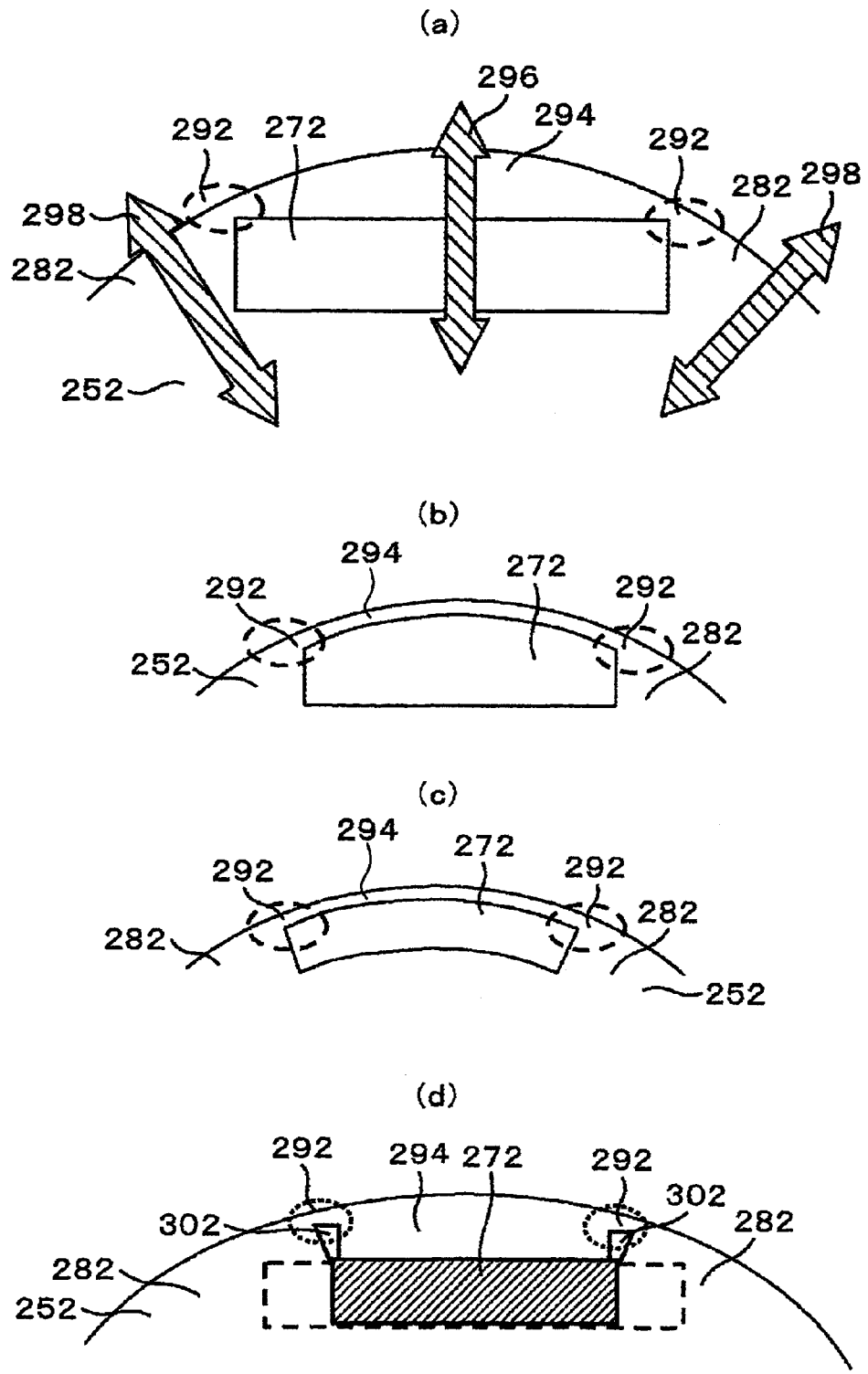

FIG. 21 illustrates varying relationships that may be achieved between the rotor core 252 and the magnet insertion holes 272 and between the magnetic poles and the auxiliary magnetic poles. While the structures adopted in the examples presented in FIGS. 21(a) through 21(d) are basically similar to one another, they feature magnets formed in shapes different from one another. The following description is given in reference to the example in FIG. 21(a), chosen as a representative. A magnet insertion hole 272 is formed at the rotor core 252. While a permanent magnet is inserted in the magnet insertion hole in reality, an illustration of the permanent magnet is not included. A d-axis magnetic flux 296 is generated with the permanent magnet inserted in the magnet insertion hole 272, and the d-axis magnetic flux 296 thus generated achieves inter-linkage with the stator winding. A magnetic pole portion 294 is formed at the core where the magnet insertion hole 272 is present, located toward the rotor, and the d-axis magnetic flux 296 is guided to the stator via the magnetic pole piece 294.

Bridge portions 292 are formed between the magnet insertion hole 272 and the side surface of the rotor core 252 facing toward the stator. The bridge portions 292 are each located between the magnetic pole piece 294 and an auxiliary magnetic pole 282 and with the bridge portion 292 constricting the section of the magnetic circuit, a magnetically saturated state is achieved. In the magnetically saturated state, the magnetic flux passing through the bridge portion 292 is restricted, and as a result, the magnetic flux leakage through the area between the magnetic pole piece 294 and the auxiliary magnetic pole 282 can be reduced. It is to be noted that a magnetic circuit through which a q-axis magnetic flux 298 passes is formed at the auxiliary magnetic pole 282 and reluctance torque is thus generated.

While the permanent magnet shown in FIG. 21(b) is formed in a different shape, other structural features are substantially identical. The magnetic pole piece 294 formed between the permanent magnet and the outer circumference of the rotor core 252 is very narrow. The extent of magnetic flux leakage from the magnetic pole piece 294 to the auxiliary magnetic poles 282 is reduced via the bridge portions 292. While the surface of the permanent magnet located toward the stator assumes a curved contour in FIG. 21(b), the entire permanent magnet shown in FIG. 21(c) is formed in a circular arc shape running along the outer circumference of the rotor.

FIG. 21(d) shows another structure with which magnetic flux leakage from the magnetic pole piece 294 to the auxiliary magnetic poles 282 can be reduced. The magnet insertion holes, having been described in reference to FIGS. 11 through 14 and FIGS. 16 through 20 assume varying lengths along the circumference of the rotor in the direction of rotation. When a smaller length is assumed along the circumferential direction, the sectional area of the magnetic circuit at each bridge portion 292 increases, which leads to an increase in the quantity of saturated magnetic flux. Under such circumstances, the extent of magnetic flux leakage through the area between the magnetic pole piece and the auxiliary magnetic pole is bound to rise, which, in turn, is likely to result in lowered efficiency and lower torque. In order to prevent such an eventuality, the structure shown in FIG. 21(d) includes magnetic voids 302 formed therein. The magnetic voids 302 are each constituted with an air gap formed at the time of electromagnetic steel sheet formation, and a bridge portion 292 is formed between each space 302 and the outer circumferential surface of the rotor core facing toward the stator. The sectional area of the magnetic circuit at the bridge portion 292 is narrowed, and, as a result, the saturated magnetic flux can be reduced. This ultimately makes it possible to reduce the extent of magnetic flux leakage.

The extent of magnetic flux leakage reduced as has been described in reference to FIG. 21(d) may instead be reduced through an embodiment shown in FIG. 22. FIG. 22(a) illustrates how the magnetic flux leaks through bridge portions formed as has been described in reference to FIG. 21(d). A magnet insertion hole 272a is formed on one side along the rotational axis and a magnet insertion hole 272b is formed on another side along the rotational axis. In the figure, the magnet insertion hole 272b located on the other side is shaded so as to distinguish it from the magnet insertion hole 272a. The magnet insertion hole 272a and the magnet insertion hole 272b are formed slightly larger than the magnet pieces so as to facilitate the magnet piece insertion process, as has been explained earlier. The magnet pieces are disposed so that the central lines, each running through the center between the left side and the right side of one of the magnet pieces, are all aligned along the central line of the magnetic pole, and the magnet insertion holes 272a and 272b are formed so as to achieve symmetry along the circumferential direction relative to the central line of the magnetic pole.

The magnet pieces to be embedded in the magnet insertion holes and the magnet insertion holes all achieve rectangular sectional shapes on a section perpendicular to the rotational axis. Since the outer edge of the rotor forms the circumference of a circle, the distance between a magnet ranging over a great length along the circumferential direction and the outer circumference of the rotor core is different from the distance between a magnet ranging over a smaller length along the circumferential direction and the outer circumference of the rotor core. The arrows in FIGS. 22(a) and 22(b), pertaining to bridge portions 292a and 292b, each indicate the distance between the corner of a magnet insertion hole and the outer circumference of the rotor core, i.e., the areal size of the sectional area of the corresponding magnetic circuit.

If the sectional areas of the bridge portions 292a and 292b indicated by the arrows are large, a greater quantity of magnetic flux will be magnetically saturated. In such a case, the magnetic fluxes, originating from the magnets will pass from the rotor to the stator in smaller quantities, but instead significant quantities of magnetic fluxes will remain within the rotor. In other words, the magnets will not be effectively utilized under such circumstances. Accordingly, the magnet insertion hole 272b ranging over a smaller circumferential length is formed further toward the outer circumference of the rotor along the radial direction relative to the position of the magnet insertion hole 272a ranging over a greater circumferential length, as shown in FIG. 22(b).

In the positional arrangement shown in FIG. 22(b), the magnet insertion hole 272b ranging over a smaller circumferential length is positioned further toward the outer circumference of the rotor along the radial direction relative to the magnet insertion hole 272a ranging over a greater circumferential length, and thus, the lengths of the arrows indicating the bridge portions 292a and 292b are substantially equal to each other. This means that the quantities of magnetic fluxes leaked through these two areas are substantially equal to each other and that the extent of magnetic flux leakage through the bridge portion formed in correspondence to the magnet insertion hole ranging over the smaller circumferential length can be reduced.

FIG. 22(c) shows a rotor with four poles. While it is desirable to form eight to ten poles at the rotor of a rotating electric machine used to drive a vehicle, the rotor in FIG. 22(c) has fewer magnetic poles for purposes of simplifying the illustration. As has been explained earlier, of the magnet insertion hole 272 located on one side along the axis and the magnet insertion hole 272b located on the other side along the axis, the magnet insertion hole 272b ranging over the smaller length along the circumferential direction is positioned further toward the outer circumference of the rotor along the radial direction. By adopting this structure, the extent of magnetic flux leakage can be reduced.

Figure 23:
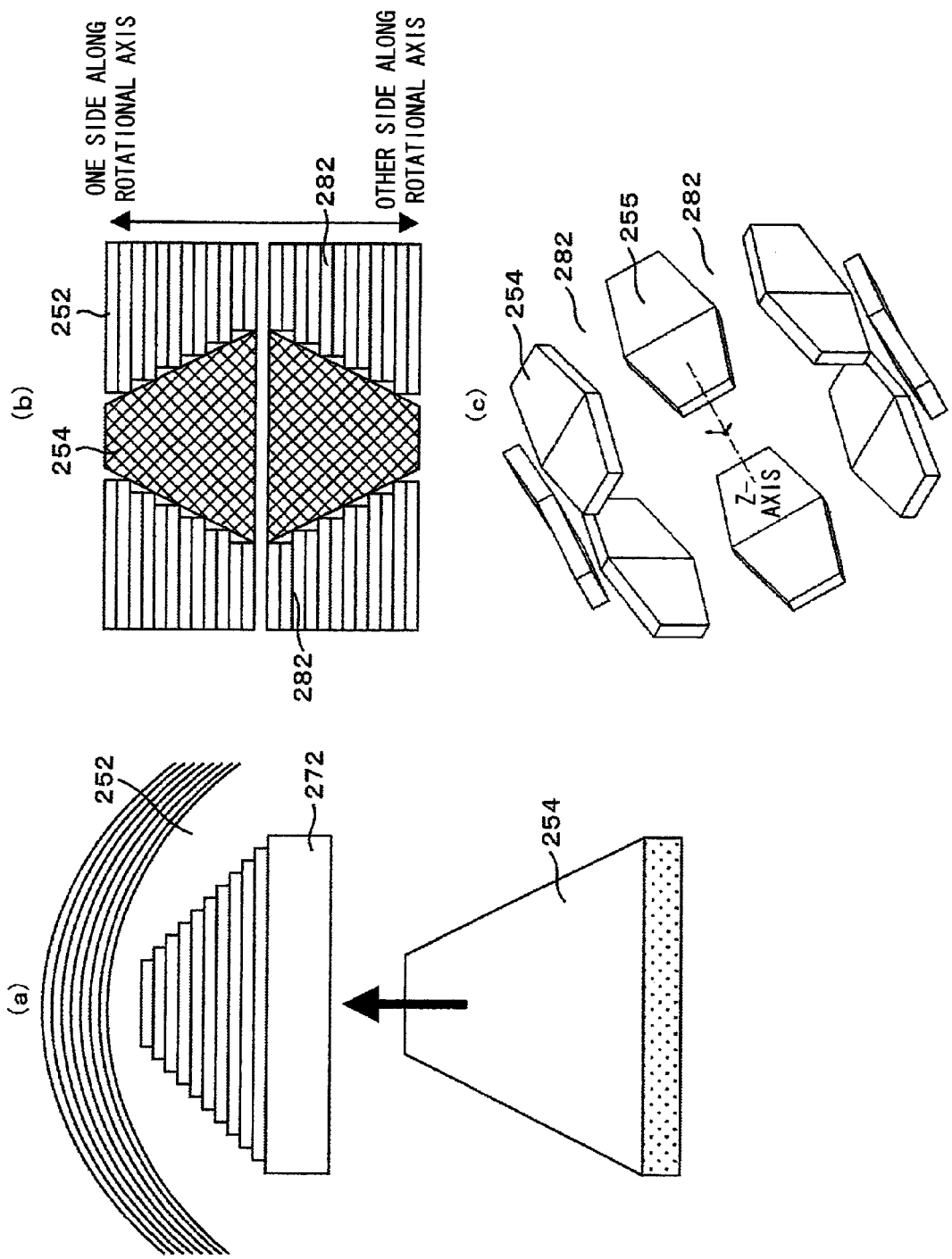

In the embodiment described in reference to FIG. 22, the permanent magnets are each made up with substantially quadrangular magnet pieces. An embodiment achieved by adopting the same basic concept in conjunction with trapezoidal magnets is now described in reference to FIG. 23. As shown in FIG. 23(a), rectangular magnet insertion holes 272 are formed at electromagnetic silicon steel sheets by ensuring that magnet insertion holes ranging over a smaller circumferential length are positioned further toward the outer circumference of the rotor. The rotor core 252 is formed by laminating the electromagnetic steel sheets with such magnet insertion holes 272 formed therein one on top of another and then the rotor is assembled by inserting trapezoidal magnets through the magnet insertion holes 272. In this structure, each trapezoidal magnet and the corresponding magnet insertion hole assume a position closer to the outer circumference of the rotor along the radial direction as the length of the trapezoidal magnet, measured along the circumferential direction, becomes smaller. As a result, the sectional area of the magnetic circuit at the bridge portion located between the magnetic pole piece and an optional auxiliary magnetic pole 282 can be reduced, which, in turn, makes it possible to reduce the quantity of magnetic flux required to achieve saturation at the bridge portion and ultimately reduce the magnetic flux leakage.

FIG. 23(b) is a sectional view of an area where a permanent magnet is disposed, taken from the stator side. It shows magnet pieces disposed so that the magnet assumes a smaller length along the circumferential direction at the two ends located on one side and another side facing opposite each other along the rotational axis. The portions of the magnet ranging over a larger length along the circumferential direction face opposite each other at the center of the rotational axis. Rotor blocks are formed in correspondence to the one side and the other side, the rotor blocks are set facing opposite each other and then they are locked together to assemble the rotor. In a rotor manufactured by stacking rotor blocks over two stages with axial symmetry, the magnets are not allowed to project out toward the axis and instead are held in place. In addition, the extent of magnetic flux leakage occurring at the ends of the rotor can be reduced.

FIG. 23(c) shows the permanent magnet positional arrangement adopted for the rotor as a whole. A permanent magnet 254 having N polarity on its side facing toward the stator and a permanent magnet 255 having S polarity on its side facing toward the stator are disposed in an alternate pattern, with auxiliary magnetic poles 282 formed between the successive magnetic poles at the rotor core (not shown). Magnet insertion holes are formed at the electromagnetic steel sheets used to constitute the rotor core so that the width of the magnet insertion holes is altered from one sheet to another, as shown in FIG. 23(a) or from each set of predetermined number of electromagnetic steel sheets to the next set. The electromagnetic steel sheets with such magnet insertion holes of varying widths are then laminated. The magnets are each disposed so that the magnet portion with the smallest width, measured along the circumferential direction, is positioned further toward the outer circumference of the rotor along the radial direction, away from the axial center. As a result, the extent of magnetic flux leakage occurring around the magnet portion with the smaller circumferential length is reduced, allowing more effective utilization of the magnet.

FIG. 7, FIG. 20(a) and FIG. 23(c) each pertain to a rotating electric machine with an even number of pole pairs. For instance, the rotating electric machine achieved by adopting the embodiment shown in FIG. 7 will have sixteen poles, i.e., eight pole pairs. In addition, the rotating electric machine achieved by adopting the embodiment shown in FIG. 20(a) or FIG. 23(c) will have eight poles, i.e., four pole pairs. It is desirable that the magnet weight on top side and the magnet weight on the bottom side of the rotor in a rotating electric machine be in balance. Any of the block skew formations according to the present invention having been described above assures good weight balance between the top side and the bottom side of the rotor and assures smooth rotation in a rotating electric machine with an even number of pole pairs. The block skew formations according to the present invention will prove particularly effective in a low-speed rotation range. It is desirable to form eight poles or twelve poles at the rotor so as to form an even number of pole pairs. A rotor with eight or twelve magnetic poles also assures reliable generation of magnetic torque and reluctance torque.

The embodiments described above pertain to structures that may be adopted in a motor with embedded magnets, which includes permanent magnets embedded within the rotor core. The permanent magnets are embedded inside the rotor core in the embodiments disclosing various block skew formations. The magnet insertion holes formed, as described earlier, in conjunction with rectangular magnet pieces assume uniform dimensions as long as the gap allowance is disregarded or as long as the work space required for magnet piece insertion is disregarded. In the embodiments described above, the rotor core is formed by laminating electromagnetic steel sheets one on top of another along the rotational axis. Such electromagnetic steel sheets may be silicon steel sheets assuring superior characteristics. However, the present invention may be adopted in conjunction with a core manufactured by compacting a powder magnetic core material, instead of laminating electromagnetic steel sheets. It is to be noted that the magnets and the holes achieve a rectangular shape, the shape of a quadrangle with a curved upper side, or a fan shape at their sections taken over a plane perpendicular to the rotational axis, as has been described in reference to FIG. 21. Magnets with a rectangular section assure better productivity.

In addition, while permanent magnets each made up with sintered magnet pieces combined together assure superior characteristics, the present invention is not limited to applications using such permanent magnets. For instance, it may be adopted in combination with bonded magnets, formed to achieve any of the shapes described above, by binding magnetic powder with resin. In such a case, the bonded magnets may each be formed as a single piece magnet through injection molding or the like in any of the shapes shown in FIGS. 11 through 14 and FIGS. 17 through 23. The use of bonded magnets is advantageous in that the overall manufacturing process is simplified since the magnets can be inserted through a smaller number of insertion steps.

The torque pulsation reducing measures described above are achieved by improving the rotor structure. The ultimate object of torque pulsation reduction in the entire rotating electric machine can be achieved more effectively by combining stator-side pulsation reducing measures and rotor side pulsation reducing measures.

Figure 24:
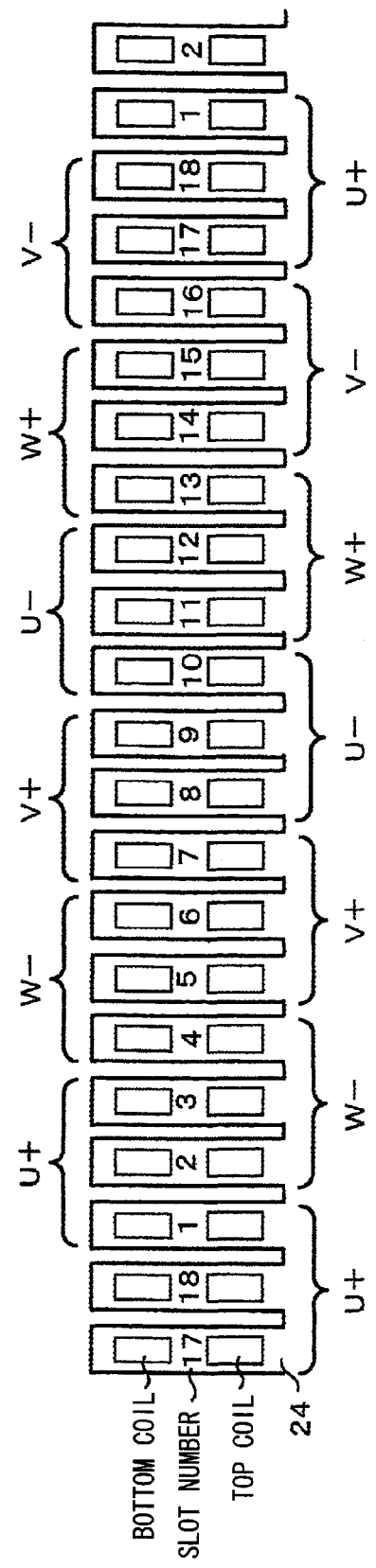

FIG. 24 presents an example of a stator winding formed by adopting a fractional pitch winding system. Eighteen slots 24, assigned with slot numbers 1 through 18, are formed over the entire circumference of the stator, with a bottom coil disposed further into each slot and a top coil disposed toward the opening of the slot. U+ and U− indicate coils assuming a U-phase among three phases. Likewise, V+ and V− indicate coils assuming a V-phase among three phases and W+ and W− indicate coils assuming a W-phase among three phases.

While the top coil and the bottom coil disposed in the slot assigned with slot No. 1, are both U+ phase coils, the top coil and the bottom coil disposed in each of the slot assigned with slot nos. 2 and 3 assume phases different from each other. Likewise, the top coils and the bottom coils in the slots assigned with slot nos. 5 and 6, the top coils and the bottom coils in the slots assigned with slot nos. 8 and 9, the top coils and the bottom coils in the slots assigned with slot nos. 11 and 12, the top coils and the bottom coils in the slots assigned with slot nos. 14 and 15 and the top coils and the bottom coils in the slots assigned with slot nos. 17 and 18 assume different phases. Torque pulsations can be reduced by using a fractional pitch winding with the coils disposed as described above. In this example, sixth-order torque pulsations can be reduced. By reducing the twelfth order pulsations as described earlier at the rotor used in combination with this stator, pulsations of sixth order and pulsations of twelfth order can both be reduced in the rotating electric machine as a whole. Pulsations of another order can be reduced by modifying the specific positional relationship among the coils wound in the fractional pitch winding. For instance, by modifying the positional arrangement, pulsations of twelfth order can be reduced. A rotating electric machine assuring even better performance can be achieved by reducing torque pulsations by taking optimal measures both at the stator and the rotor in combination, as described above.

Figure 25:
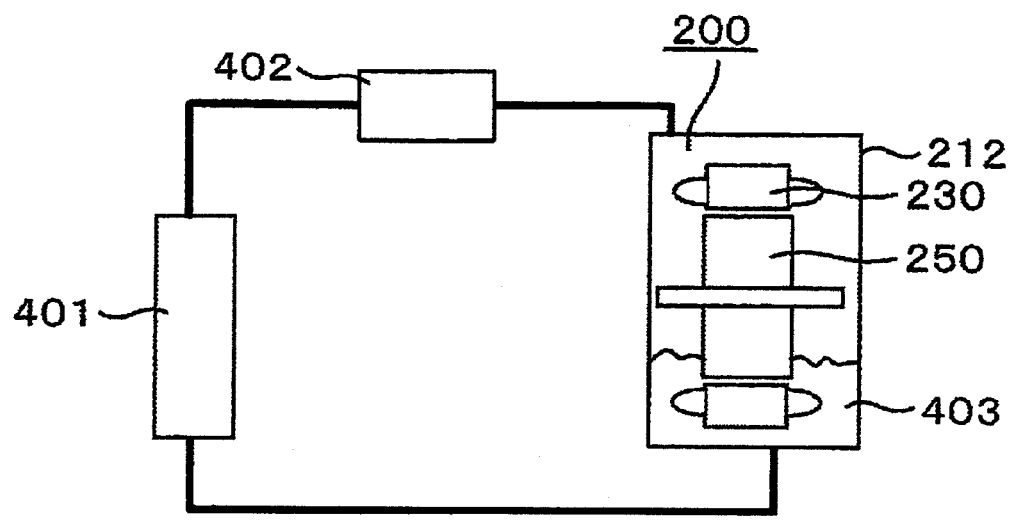

FIG. 25 presents an example of a cooling system that may be used to cool a rotating electric machine. While a rotating electric machine can be cooled with cooling air, there are certain conditions under which it is installed in a vehicle that calls for oil cooling. For instance, a built-in rotating electric machine used as an integrated part of the transmission may be better cooled with the transmission fluid than cooling air. A rotating electric machine 200 is sealed in a housing 212, which is partially filled with cooling oil 403 to a level at which the cooling oil 403 comes in contact with the rotor 250. The oil 403 is circulated via a cooling pump 402 and is cooled at a radiator 401. One of the issues of automotive motors that include neodymium magnets with low heat withstanding characteristics is that the magnets are bound to become demagnetized at high temperatures. The performance of a rotating electric machine provided as a compact unit, in particular, tends to become more unreliable at higher temperatures and accordingly, the temperature increase needs to be minimized by improving the cooling efficiency in order to provide a high-performance rotating electric machine as a more compact unit. This issue is addressed in the example presented in FIG. 25 by keeping down the temperature increase via a cooling path, so as to facilitate miniaturization of rotating electric machines to be installed in electric vehicles including hybrid vehicles. The oil 403 having been cooled at the radiator 401 cools the rotor 250. At the same time, the cooling oil is carried upward by the rotating rotor 250 and is thus continuously delivered to the rotor 250 and the stator 230 to cool them both.

Next, the ease of polarization, another significant aspect characterizing the embodiments described earlier is explained.

Neodymium magnets achieving high energy density, often used in compact high output magnet motors in recent years, impart strong coercive force. Namely, since the state of magnetization within a neodymium magnet does not change readily even as the outside magnetic field changes, it assures magnetic stability, but this also means that, in order to become polarized, the neodymium magnet requires a high-energy polarizing magnetic field. A permanent magnet is polarized with a magnetic flux generated at a polarization coil disposed so as to enclose the permanent magnet by supplying power to the polarization coil. As the polarization within the magnet is oriented with an outside magnetic field the intensity of which exceeds a predetermined value, the magnetic material becomes a permanent magnet holding the imposed state of magnetization. The outside magnetic field in this instance is referred to as a polarizing magnetic field. The magnetic field generated via the polarization coil only needs to achieve an intensity exceeding the required magnet polarizing magnetic field intensity momentarily to polarize the magnet, and for this reason, it is desirable to polarize the magnet by momentarily supplying a large current to the coil. In other words, if a large current is continuously supplied, the coil will generate a great deal of heat, causing a temperature rise beyond the tolerated range. When a large magnetic field is required to polarize a large magnet, a large polarization coil must be used. As power is supplied to a polarization coil, a force referred to as a "hoop force" is at work so as to achieve a circular coil form. When a large magnetic field is generated via a large coil, a very large hoop force will be imparted. This gives rise to a concern that the polarization coil tends to become damaged readily as it is used for polarization repeatedly.

Figure 26:
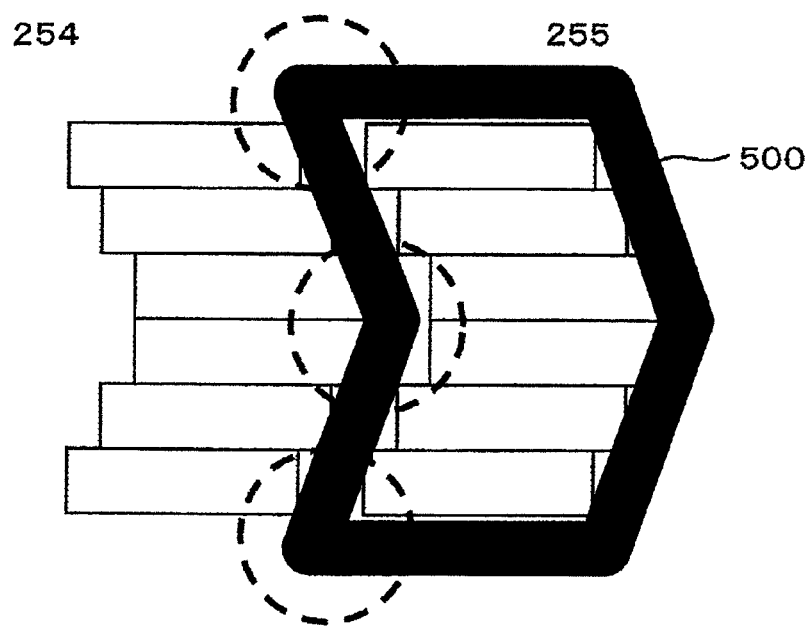

FIG. 26 shows the shape of a polarization coil that may be used in conjunction with a permanent magnet formed in an undesirable shape as described earlier. The undesirable magnet shape requires a boomerang-shaped polarization coil that includes portions enclosed by dotted circles in the figure. A coil assuming such a shape cannot be firmly held through mechanical means. For instance, the polarization coil is bent with an acute angle in some of the areas enclosed by the dotted circles in FIG. 26, and such areas of the polarization coil bent with acute angles tend to become damaged readily as they are subjected to the hoop force.

Figure 27:
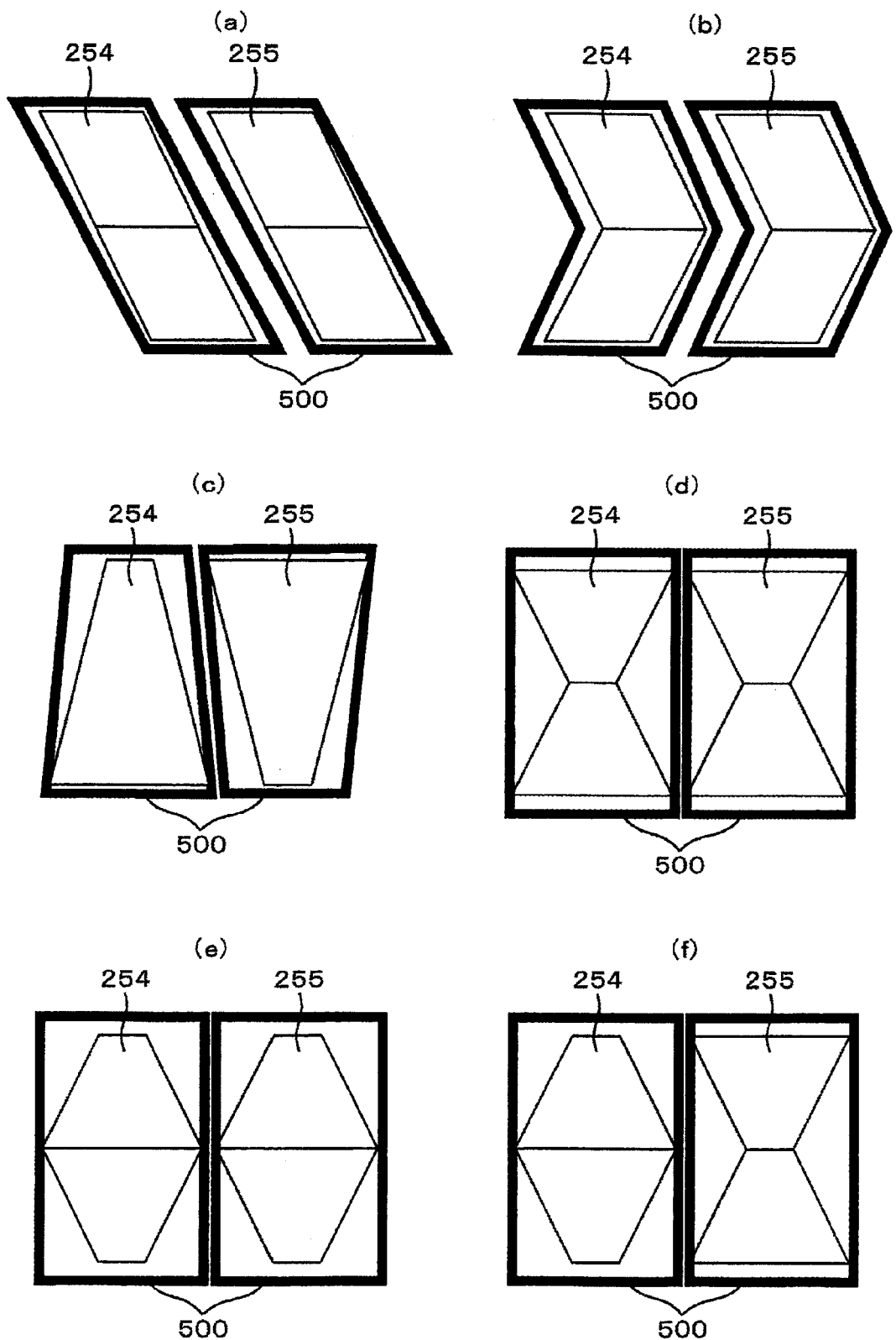

FIG. 27 shows permanent magnets 254 and 255 and polarization coils 500 assuming varying shapes. FIGS. 27(*a*) and 27(*b*) each show a shape that may be assumed for polarization coils used to polarize magnets with an undesirable form. FIGS. 27(*c*), 27(*d*), 27(*e*) and 27(*f*), on the other hand, each show a shape that may be adopted in polarization coils 500 to be used to polarize permanent magnets formed by adopting a desirable block skew formation in conjunction with magnet pieces, as has been described earlier. The polarization coil used in conjunction with magnets adopting a desirable block skew positional arrangement can be formed in a simple rectangular or trapezoidal shape and thus, sturdy polarization coils assuring a high level of strength can be manufactured with ease. This ultimately assures better ease in polarization and improves productivity.

(Advantages)

The rotating electric machines described in reference to the embodiments achieve the following advantages.

(1) Through a "block skew formation" referring to a desirable permanent magnet shape or a desirable positional arrangement with which magnet pieces are disposed to form permanent magnets, torque pulsations can be reduced. There is an added advantage of improved productivity.

For instance, assuming that the individual magnet pieces constituting each permanent magnet range along the circumferential direction over n different widths, torque pulsations can be reduced by creating a difference in the circumferential length from one magnet piece to the next, which is equivalent to 120°/n in electrical angle. While it is desirable to minimize the extent of magnet piece manufacturing error or the like relative to the difference value calculated as described above, a satisfactory torque pulsation reducing effect is achieved as long as the error remains within a +5° to −5° range in electrical angle. It is to be noted that n is an integer equal to or greater than 2 and it is desirable that n be equal to or greater than 2 and equal to or less than 4.

(2) While a torque pulsation reducing effect is achieved by adopting a block skew formation described in reference to a desirable magnet piece shape or a desirable magnet piece positional arrangement, the difference between the lengths of the magnet pieces measured along the circumferential direction may be set as follows, instead of setting it to a value equivalent to 120°/n in electrical angle as explained above. Namely, assuming that the various magnet pieces range along the circumferential direction over n different widths, the lengths of the individual magnet pieces measured along the circumferential direction, may be altered so as to create a difference in the length equivalent to 60°/n in electrical angle. While it is desirable to minimize the extent of error relative to the difference value calculated as described above, a satisfactory torque pulsation reducing effect is achieved as long as the error remains within a +5° to −5° range in electrical angle. It is to be noted that n is an integer equal to or greater than 1 and it is desirable that n be equal to or greater than 1 and equal to or less than 4.

(3) The permanent magnets are each made up with a plurality of magnet pieces disposed by ensuring that the central lines running through the centers of the magnet pieces, taken along the circumferential direction, which are parallel to the rotational axis, are aligned along the rotational axis. Thus, magnet pieces can be inserted after forming part of the rotor core or forming the entire rotor core by laminating electromagnetic steel sheets one on top of another, assuring superior productivity.

(4) As described above, the centers of the magnet pieces taken along the circumferential direction are in alignment with one another along the axial direction, and thus, a structure that does not manifest any significant thrust force is configured, making it possible to assure high levels of safety and reliability.

The auxiliary magnetic poles, via which reluctance torque is generated, are formed so as to inclined relative to the rotational axis, i.e., so as to range diagonally along the circumference of the rotor. The inclining direction is reversed from one auxiliary magnetic pole to the next auxiliary magnetic pole, so as to cancel out thrust components in the rotor as a whole. As a result, hardly any thrust force occurs and superior safety and reliability are assured.

(5) By adopting any of the structures described earlier, better magnet productivity is assured, as has been explained. The magnet productivity, in turn, is bound to lead to manufacturing cost reduction.

(6) A rectangular or square polarization coil can be used and therefore, the polarization process can be executed with better ease.

Since the polarization coils are allowed to adopt a structure less likely to be adversely affected by the hoop force, the polarization coils are better protected from any damage. More specifically, the polarization coils adopting a shape less likely to be adversely affected by the force, having no sharp corners with an acute angle (less than) 90°, can be used.

(7) As described earlier, torque pulsations are reduced by assuming different sectional shapes or different circumferential positions for the q-axis magnetic circuit, e.g., by offsetting the auxiliary magnetic pole, in correspondence to changes in the magnet insertion hole shape. Assuming that m changes occur along the circumferential direction or that there are m stages ranging over m different lengths along the circumferential direction, the width (the length of the internal circumferential surface ranging along the circumference of the rotor) or the position can be altered along the circumferential direction at the magnet insertion hole by an extent equivalent to 120°/m in electrical angle, so as to reduce torque pulsations. For instance, the magnet insertion hole in which the permanent magnet 254 is inserted in FIG. 19(a) is formed by directly connecting two different holes ranging over different widths along the circumferential direction, one next to the other along the axis of the stator, and the difference between the top-side hole in the figure, measured along the circumferential direction, and the length of the bottom-side hole in the figure, measured along the circumferential direction, is equivalent to 120°/m in electrical angle. While it is desirable to minimize the extent of error relative to the difference value calculated as described above, a satisfactory torque pulsation reducing effect is achieved as long as the error remains within a +5° to −5° range in electrical angle. It is to be noted that m is an integer equal to or greater than 2 and it is desirable that m be equal to or greater than 2 and equal to or less than 4. Once the number of varying widths or various stages exceeds four, the productivity is bound to be compromised due to an excessive number of stages stacked along the axial direction.

(8) As described earlier, torque pulsations are reduced by assuming different sectional shapes or different circumferential positions for the q-axis magnetic circuit, e.g., by offsetting the auxiliary magnetic pole, in correspondence to changes in the magnet insertion hole shape. Assuming that m changes occur along the circumferential direction or that there are m stages ranging over m different lengths along the circumferential direction, a difference is created in the length over which the magnet insertion hole ranges along the circumferential direction or a positional offset is created in the magnet insertion hole by an extent equivalent to 60°/m in electrical angle. For instance, the magnet insertion hole in which the permanent magnet 254 is inserted in FIG. 19(b) is formed by directly connecting three different holes ranging over different widths along the circumferential direction, one next to the other along the axis of the stator, and the difference between the lengths of any two consecutive holes among the three holes, measured along the circumferential direction, is equivalent to 60°/m in electrical angle. By creating such a difference, torque pulsations can be reduced. It is to be noted that a satisfactory torque pulsation reducing effect is achieved as long as the error relative to 60°/m in electrical angle remains within +5° to −5° in electrical angle. It is to be noted that m is an integer equal to or greater than 1 and it is desirable that m be equal to or greater than 1 and equal to or less than 4. Once the number of variations or stages exceeds four, the productivity is bound to be compromised due to an excessive number of stages stacked along the axial direction.

(9) Pulsations attributable to the magnetic torque can be reduced by using permanent magnets assuming a trapezoidal shape and ensuring that the difference between the length of the upper base and the length of the lower base of the trapezoidal is equivalent to 60° or 120° in electrical angle. In addition, auxiliary magnetic poles, which contribute to reluctance torque generation, are formed by reversing the inclining direction relative to the rotational axis from one auxiliary magnetic pole to the next auxiliary magnetic pole. Through these measures, the reluctance torque pulsations can be reduced and thrust force components can be canceled out by each other.

There is an added advantage expected of the structure described above in that the adverse effect of the hoop force in the polarization coils can be reduced.

The embodiments described above may be adopted singularly or in combination to realize a singular advantage or a combination of advantages. As long as the features characterizing the present invention are not compromised, the present invention is not limited to any of the specific structural particulars described herein.

The disclosure of the following priority application is herein incorporated by reference:
Japanese Patent Application No. 2009-186969, filed Aug. 12, 2009

The invention claimed is:

1. A rotating electric machine for vehicular use comprising:
   a stator that includes a stator core and a stator winding wound at the stator core; and
   a rotor that is rotatably disposed relative to the stator and includes a rotor core formed by laminating a plurality of electromagnetic steel sheets with a plurality of magnet insertion holes formed therein and includes a plurality of permanent magnets each held in each of the plurality of magnet insertion holes to form a magnetic pole, wherein:
   each of the plurality of permanent magnets extends along a rotor axis and is formed in a shape assuming at least two different lengths along a circumference of the rotor; and
   the each of the plurality of permanent magnets is constituted with n (n is an integer equal to or greater than 2) types of magnet pieces set side-by-side along the rotor axis; and
   the n types of magnet pieces assume lengths along the circumference of the rotor that are different from one another by an extent equivalent to approximately 120°/n in electrical angle, and the n types of magnet pieces are disposed so that central lines running through centers of the magnet pieces, assumed along the circumference of the rotor, form a substantially single straight line running along the rotor axis.

2. A rotating electric machine for vehicular use according to claim 1, wherein:
   the n types of magnet pieces constituting the each of the permanent magnets each assume a substantially quadrangular shape viewed from a stator side.

3. A rotating electric machine for vehicular use according to claim 1, wherein:

the n types of magnet pieces constituting the each of the permanent magnets all assume a form achieving symmetry relative to the central lines running through the centers of the magnet pieces.

4. A rotating electric machine for vehicular use according to claim 1, wherein:
the magnet insertion holes are each constituted with m (m is an integer equal to or greater than 2) types of holes, assuming lengths at hole inner circumferential surfaces along the circumference of the rotor, which are different from one another, and set one after another along the rotor axis; and
the lengths of the m types of holes at the hole inner circumferential surfaces along the circumference of the rotor are different from one another by an extent equivalent to approximately 120°/m in electrical angle.

5. A rotating electric machine for vehicular use according to claim 4, wherein:
differences in lengths of the magnet insertion holes at hole inner circumferential surfaces along the circumference of the rotor from on another are set within a range between a length equivalent to $(120/m-5)°$ in electrical angle and a length equivalent to $(120/m+5)°$ in electrical angle.

6. A rotating electric machine for vehicular use according to claim 1, wherein:
differences in lengths of the n types of magnet pieces along the circumference of the rotor from one another are set within a range between a length equivalent to $(120/n-5)°$ in electrical angle and a length equivalent to $(120/n+5)°$ in electrical angle.

7. A rotating electric machine for vehicular use comprising:
a stator that includes a stator core and a stator winding wound at the stator core; and
a rotor that is rotatably disposed relative to the stator and includes a rotor core formed by laminating a plurality of electromagnetic steel sheets with a plurality of magnet insertion holes formed therein and includes a plurality of permanent magnets each held in each of the plurality of magnet insertion holes to form a magnetic pole, wherein:
each of the plurality of permanent magnets extends along a rotor axis and is formed in a shape assuming at least two different lengths along a circumference of the rotor; and
the each of the plurality of permanent magnets is constituted with n (n is an integer equal to or greater than 2) types of magnet pieces set side-by-side along the rotor axis; and
the n types of magnet pieces assume lengths along the circumference of the rotor that are different from one another by an extent equivalent to approximately 60°/n in electrical angle, and the n types of magnet pieces are disposed so that central lines running through centers of the magnet pieces, assumed along the circumference of the rotor, form a substantially single straight line running along the rotor axis.

8. A rotating electric machine for vehicular use according to claim 7, wherein:
the n types of magnet pieces constituting the each of the permanent magnets each assume a substantially quadrangular shape viewed from a stator side.

9. A rotating electric machine for vehicular use according to claim 7, wherein:
the n types of magnet pieces constituting the each of the plurality of permanent magnets all assume a form achieving symmetry relative to the central lines running through the centers of the magnet pieces.

10. A rotating electric machine for vehicular use according to claim 7, wherein:
the magnet insertion holes are each constituted with m (m is an integer equal to or greater than 2) types of holes, assuming lengths at hole inner circumferential surfaces along the circumference of the rotor, which are different from one another, and set one after another along the rotor axis; and
the lengths of the m types of holes at the hole inner circumferential surfaces along the circumference of the rotor are different from one another by an extent equivalent to approximately 60°/m in electrical angle.

11. A rotating electric machine for vehicular use according to claim 10, wherein:
differences in lengths of the magnet insertion holes at hole inner circumferential surfaces along the circumference of the rotor from one another are set within a range between a length equivalent to $(60/m-5)°$ in electrical angle and a length equivalent to $(60/m+5)°$ in electrical angle.

12. A rotating electric machine for vehicular use according to claim 7, wherein:
differences in lengths of the n types of magnet pieces along the circumference of the rotor from one another are set within a range between a length equivalent to $(60/n-5)°$ in electrical angle and a length equivalent to $(60/n+5)°$ in electrical angle.

13. A rotating electric machine for vehicular use comprising:
a stator that includes a stator core and a stator winding wound at the stator core; and
a rotor that is rotatably disposed relative to the stator and includes a rotor core formed by laminating a plurality of electromagnetic steel sheets with a plurality of magnet insertion holes formed therein and includes a plurality of permanent magnets each held in each of the plurality of magnet insertion holes to form a magnetic pole, wherein:
each of the plurality of permanent magnets extends along a rotor axis and is formed in a shape assuming at least two different lengths along a circumference of the rotor; and
the each of the plurality of permanent magnets held in one of the magnet insertion holes assumes an isosceles trapezoid shape with an upper base thereof set on one side along the rotor axis and a lower base thereof set on another side along the rotor axis viewed from a stator side; and
auxiliary magnetic poles are formed for reluctance torque generation among a plurality of magnetic poles formed with the plurality of permanent magnets.

14. A rotating electric machine for vehicular use according to claim 13, wherein:
a difference between lengths of the upper base and the lower base of the each of the plurality of permanent magnets, which assumes the isosceles trapezoidal shape, held in each magnet insertion hole is equivalent to 120° or 60° in electrical angle; and
the auxiliary magnetic poles each extend along the rotor axis so as to incline along the circumference of the rotor and a pair of auxiliary magnetic poles among the auxiliary magnetic poles, disposed on two opposite sides of one of the plurality of magnetic poles formed with the plurality of permanent magnets, are set so that the pair of auxiliary magnetic poles incline along opposite directions.

15. A rotating electric machine for vehicular use according to claim 14, wherein:

the rotor core is constituted with a plurality of stages, which are separated from one another along the rotor axis; and the plurality of stages are offset relative to one another along the circumference of the rotor so as to form the auxiliary magnetic poles on an incline along the circumference of the rotor.

16. A rotating electric machine for vehicular use comprising:

a stator that includes a stator core and a stator winding wound at the stator core; and a rotor that is rotatably disposed relative to the stator and includes a rotor core formed by laminating a plurality of electromagnetic steel sheets with a plurality of magnet insertion holes formed therein and includes a plurality of permanent magnets each held in each of the plurality of magnet insertion holes to form a magnetic pole, wherein:

each of the plurality of permanent magnets extends along a rotor axis and is formed in a shape assuming at least two different lengths along a circumference of the rotor; and the plurality of permanent magnets are each constituted with a plurality of magnet pieces each forming an isosceles trapezoid shape including a first base and a second base;

the plurality of magnet pieces constituting each of the plurality of permanent magnets are disposed so that first bases of the plurality of magnet pieces along the circumference of the rotor at two ends located on one side and another side faces opposite each other along the rotor axis and second bases of the plurality of magnet pieces along the circumference of the rotor faces opposite each other at a longitudinal center of the rotor axis, and the plurality of magnet pieces are disposed so that central lines running through centers of the plurality of magnet pieces assumed along the circumference of the rotor, form a substantially single straight line along the rotor axis; and auxiliary magnetic poles are formed for reluctance torque generation among the plurality of magnetic poles formed with the plurality of permanent magnets.

17. A rotating electric machine for vehicular use according to claim 16, wherein:

a difference between lengths of the first base and the second base of each of the plurality of magnet pieces is equivalent to 120° or 60° in electrical angle.

* * * * *